(12) United States Patent
Assaf et al.

(10) Patent No.: US 11,433,546 B1
(45) Date of Patent: Sep. 6, 2022

(54) NON-VERBAL CUING BY AUTONOMOUS MOBILE DEVICE

(71) Applicant: AMAZON TECHNOLOGIES, INC., Seattle, WA (US)

(72) Inventors: Munaf Assaf, San Francisco, CA (US); Dhanik Shah, Milpitas, CA (US); Peter McGowin Kelly, Lafayette, CA (US); Simon Lucien Fillat, Mill Valley, CA (US); Nicholas Chuanji Liao, Carlsbad, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 710 days.

(21) Appl. No.: 16/169,708

(22) Filed: Oct. 24, 2018

(51) Int. Cl.
| | |
|---|---|
| *B25J 11/00* | (2006.01) |
| *B25J 9/00* | (2006.01) |
| *B25J 5/00* | (2006.01) |
| *H04N 7/14* | (2006.01) |
| *G10L 15/22* | (2006.01) |
| *G10L 15/08* | (2006.01) |
| *G06F 3/16* | (2006.01) |
| *G06V 40/16* | (2022.01) |

(52) U.S. Cl.
CPC .......... *B25J 11/0005* (2013.01); *B25J 5/007* (2013.01); *B25J 9/0003* (2013.01); *G06F 3/167* (2013.01); *G06V 40/165* (2022.01); *G10L 15/08* (2013.01); *G10L 15/22* (2013.01); *H04N 7/142* (2013.01); *G10L 2015/088* (2013.01); *G10L 2015/223* (2013.01)

(58) Field of Classification Search
CPC combination set(s) only.
See application file for complete search history.

(56) References Cited

U.S. PATENT DOCUMENTS

| | | | | |
|---|---|---|---|---|
| 2014/0092015 | A1* | 4/2014 | Xing | G06K 9/00281 345/158 |
| 2014/0207286 | A1* | 7/2014 | Wang | G06T 11/60 700/259 |
| 2015/0310672 | A1* | 10/2015 | Choukroun | G06T 17/205 345/633 |

* cited by examiner

*Primary Examiner* — Phung-Hoang J Nguyen
(74) *Attorney, Agent, or Firm* — Lindauer Law, PLLC

(57) ABSTRACT

A robot operating in an environment provides cues to users. These cues provide information to the user as to operation of the robot. Some cues may involve physical movement of at least a portion of the robot. For example, as the robot passes a user, the robot may tilt a display head up and down to simulate a nodding motion. The cues may comprise one or more motions of one or more parts of the robot. The cues may also comprise visual output, such as graphics, pictures, text, and so forth, being presented on a display device of the robot, or changing the color or brightness of a light. In some implementations, the cues may include audio output, such as sounds.

20 Claims, 10 Drawing Sheets

| TRIGGER CONDITION(S) 156 | GESTURE DATA 158 |
|---|---|
| WAKEWORD DETECTED | MOVE A MOVEABLE COMPONENT TOWARD A USER |
| ROBOT TO START MOVEMENT TO ANOTHER LOCATION | TILT MOVEABLE COMPONENT UPWARD |
| ROBOT TO STOP MOVEMENT | TILT MOVEABLE COMPONENT DOWNWARD |
| INTERACTION WITH USER CONCLUDED | MOVE A MOVEABLE COMPONENT AWAY FROM USER |
| USER WITHIN A THRESHOLD DISTANCE WHILE ROBOT STATIONARY | TILT MOVEABLE COMPONENT UP AND DOWN (NOD) |
| USER WITHIN A THRESHOLD DISTANCE WHILE ROBOT MOVING | TILT MOVEABLE COMPONENT UP AND DOWN AND CHANGE SPEED |
| WATCH TASK BEGINS | MOVE A MOVEABLE COMPONENT TOWARD A USER |
| ATTENTION REQUEST DETERMINED | MOVE A MOVEABLE COMPONENT, PLAY SOUND |
| CONFIDENCE VALUE OF USER INPUT ABOVE A THRESHOLD VALUE | TILT MOVEABLE COMPONENT UP AND DOWN (NOD) |
| CONFIDENCE VALUE OF USER INPUT BELOW A THRESHOLD VALUE | PAN MOVEABLE COMPONENT SIDE TO SIDE (SHAKE) |
| UNDEFINED TASK ERROR / CONFUSED | BACKUP, KEEPING MOVEABLE COMPONENT FACING USER, ROTATE |
| USER IS FACING ROBOT AND SPEAKING | MOVE MANIPULATOR ARM |
| VALID COMMAND GIVEN BY USER | CHANGE MAST HEIGHT FROM FIRST TO SECOND TO FIRST HEIGHT |
| DETECT PRESENCE OF PET WITHIN THRESHOLD DISTANCE | MOVE A MOVEABLE COMPONENT TOWARD THE PET |

FIG. 6

NON-VERBAL CUING BY AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 6 illustrates a table of triggers and associated gestures, according to some implementations.

Figure 1:
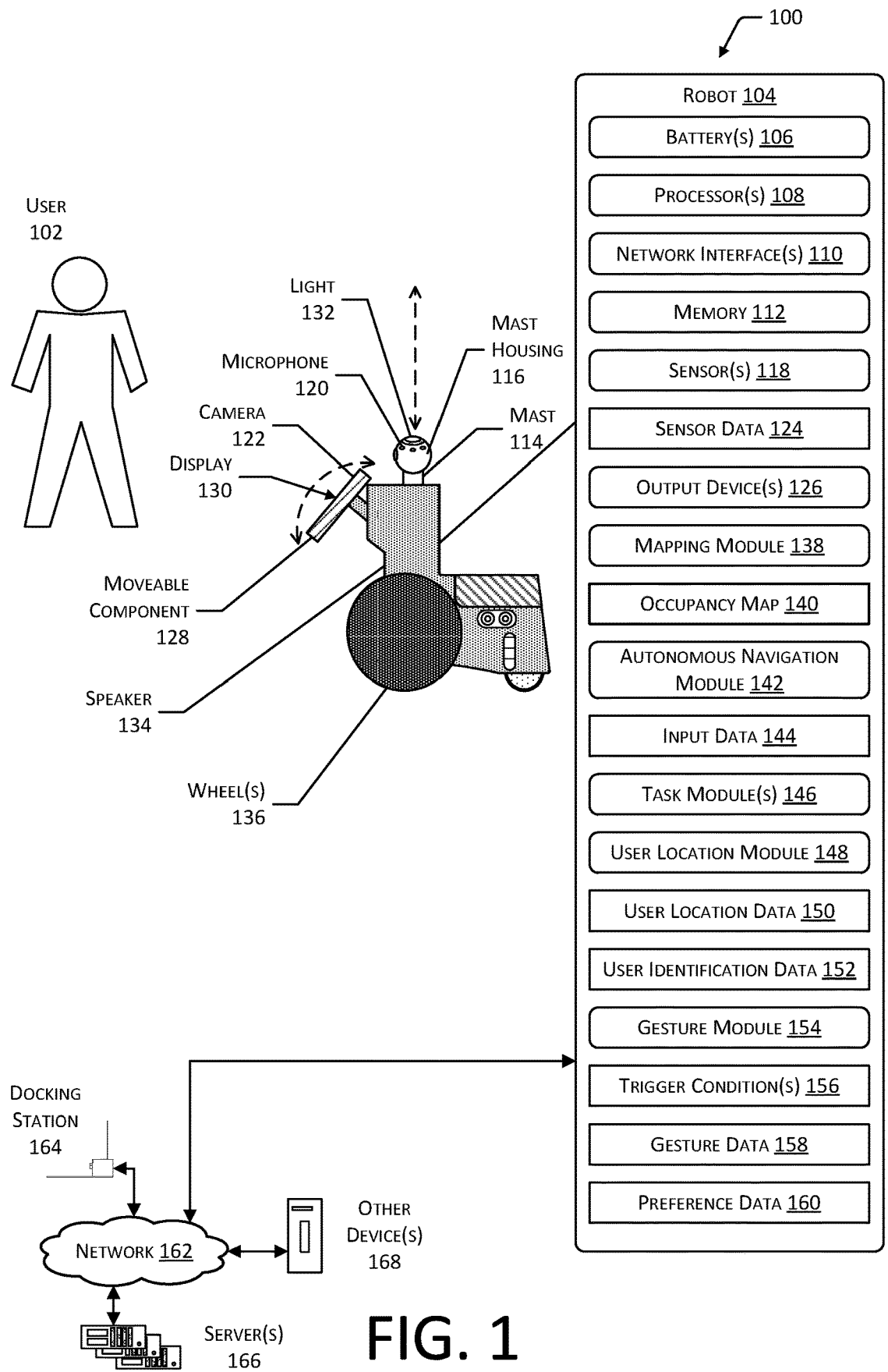
FIG. 1 illustrates a system that includes an autonomous mobile device, such as a robot, which performs gestures to provide non-verbal cuing to users, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, an autonomous mobile device, such as a robot, may perform various tasks. The robot is capable of autonomous movement, allowing it to move from one location in the environment to another without being "driven" or remotely controlled by the user or other human. Some of the tasks the robot performs may involve the robot moving about an environment. Some tasks may be initiated at user request, may have been preprogrammed, or may be determined to be performed autonomously.

The robot may coexist in an environment with one or more users. To facilitate harmonious coexistence, it is advantageous to provide the robot with the ability to produce non-verbal cues as to the operation. These cues may include gestures such as movement of a part of a robot, movement of the entire robot, or a combination thereof. For example, the robot may have a moveable component that includes a display screen and a camera. One or more actuators may allow the moveable component to pan, tilt, rotate, and so forth. The actuators may be operated to cause the moveable component to move, producing a particular gesture. For example, upon hearing a wakeword, the moveable component may pan toward the source of the utterance of the wakeword. In another example, a gesture may comprise the moveable component tilting up and down, to simulate a "nodding" behavior. In yet another example, a gesture may comprise the moveable component panning back and forth to simulate a "head shake" behavior.

These behaviors may improve safety within the environment by providing the user with an acknowledgement that the robot is aware of their presence. For example, as a robot passes by a user, the moveable component is tilted up and down to perform the "nodding" behavior, while the speed of the robot momentarily decreases until the robot passes. With this behavior, the user is assured that the robot has detected their presence.

These behaviors improve the user experience by providing feedback to the user while processing is taking place. Returning to the wakeword example above, after detecting the wakeword, audio data may be sent via a network connection to a server for processing. While the audio data is being processed by the server, and while the robot is awaiting a response, the robot is moving the moveable component. Once the response from the server is received, a task may subsequently be performed. By moving the moveable component, the robot provides an acknowledgement to the user that they were heard while also engaging the user until the response is received.

Illustrative System

FIG. 1 illustrates a system 100 in which a user 102 uses an autonomous mobile device, such as a robot 104, that performs gestures to provide non-verbal cues to the user 102, according to some implementations. The robot 104 may include a battery(s) 106 to provide electrical power for operation of the robot 104. The battery 106 may be rechargeable, allowing it to store electrical energy obtained from an external source. In other implementations, a wireless power receiver may be used to provide power for operation of the robot 104, recharge the battery 106, and so forth. The robot 104 may include a hardware processor(s) 108 (processors), a network interface(s) 110, a memory(s) 112, a mast 114, a mast housing 116 atop the mast 114, sensors 118, and so forth. The sensors 118 may include one or more microphones 120, cameras 122, or other sensors as described in more detail below. During operation, the sensors 118 may produce sensor data 124. For example, the microphones 120 may provide audio data such as a digitized representation of an analog waveform, while the camera 122 may provide images.

The robot 104 may include one or more output devices 126. The output devices 126 may include one or more of a moveable component 128, a display 130, a light 132, a speaker 134, wheels 136, and so forth. For example, the moveable component 128 may be moved by one or more actuators to provide one or more of pan, tilt, rotation, extension, and so forth. In some implementations, the moveable component 128 may include one or more of a microphone 120, camera 122, and so forth. These devices are discussed in more detail below.

A mapping module 138 may be stored in the memory 112. The mapping module 138 may use data from the sensors 118 to determine an occupancy map 140 or other representation of the physical environment. For example, one or more cameras 122 may obtain image data of the environment. The image data may be processed to determine the presence of obstacles. The occupancy map 140 may comprise data that indicates the location of one or more obstacles, such as a table, wall, and so forth. In some implementations, the occupancy map 140 may comprise a plurality of cells with each cell of the plurality of cells representing a particular area in the physical environment and having an obstacle cost value that is indicative of whether the cell contains an obstacle. An obstacle may comprise an object or feature that prevents or impairs traversal by the robot 104. For example, an obstacle may comprise a wall, stairwell, and so forth.

The robot 104 may include an autonomous navigation module 142 that provides the robot 104 with the ability to navigate within the physical environment without real-time human interaction. The autonomous navigation module 142 may implement, or operate in conjunction with, the mapping module 138 to determine the occupancy map 140 or other representation of the physical environment. The autonomous navigation module 142 and related modules are discussed in more detail with regard to FIG. 2.

During operation, the robot 104 may determine input data 144. The input data 144 may be based at least in part on sensor data 124 provided by the sensors 118 onboard the robot 104. For example, the sensor data 124 may comprise audio data indicative of an utterance by the user 102. The audio data may be processed to determine that the utterance is representative of a verbal command provided by the user 102. The input data 144 may comprise information indicative of the command, parameters associated with the command, and so forth. For example, the input data 144 may indicate a command of a request for weather information while the parameter indicates the location about which the weather information is requested.

One or more task modules 146 may be stored in the memory 112. The task modules 146 may comprise instructions that, when executed by the processor 108 perform a task. For example, a video call module may be used to have the robot 104 find a particular user 102 and present a video call using the output devices 126. In another example, a sentry task module 146 may be used to have the robot 104 travel throughout the environment and generate a report as to the presence of an unauthorized person.

The robot 104 may include in the memory 112 a user location module 148. The user location module 148 may use the sensor data 124 from sensors 118 on the robot 104 or other sensors in the environment. The user location module 148 processes the data to determine user location data 150 indicative of a user location in the environment. The user location data 150 may be indicative of coordinates within the environment that are indicative of a point associated with the user 102. For example, the user location data 150 may indicate a centroid of the area occupied by the user 102 with respect to a fixed coordinate system used to represent locations within the environment.

In some implementations, the user location module 148 may also process the data to determine user orientation data indicative of a user orientation in the environment. The user orientation data is indicative of a direction with respect to a fixed reference. For example, the user orientation data may be indicative of a heading as measured with respect to magnetic north, or an angle with respect to an axis of the fixed coordinate system. In some implementations, the user orientation data may be indicative of an angle that extends from a reference point with respect to the user 102 along a direction that is specified with respect to one or more features of the user 102. For example, the user orientation data may be based on a position of one or more of the user's 102 head, shoulders, skeleton, feet, eyes, and so forth. In another example, the user orientation data may be based at least in part on a gaze direction of the user 102, that is indicative of which direction the user 102 is looking. In one implementation, the user orientation data may indicate the line that is perpendicular from a line extending through the shoulders of the user 102, and extending away from the user 102 in a ventral direction. For example, if the user 102 is standing facing East, the user orientation data may indicate 90 degrees. In another implementation, the user orientation data may indicate the line that is perpendicular to a line extending through both eyes of the user 102 and starts at a midpoint between the eyes.

In some implementations, the user location module 148 or other modules may provide user identification data 152. The user identification data 152 provides information that is indicative of a particular user 102. The user identification data 152 may be indicative of login name, account name, serial number, and so forth. For example, the user identification data 152 may indicate that a user 102 has been identified as "Pat" or "User994481". Determination of the user identification data 152 may be based on one or more of facial recognition, voice recognition, user input, biometric data, and so forth. For example, the user location module 148 may utilize a facial recognition module that determines one or more features of a face that is present in an image acquired by a camera 122, and compare that information to previously stored enrollment data. If the features match within a threshold value, the user identification data 152 may be determined. In another implementation, the sound of the user's 102 voice may be used to identify them.

A gesture module 154 may access trigger conditions 156 to determine if one or more triggers have occurred, and if so, may use gesture data 158 to determine one or more gestures to perform. A gesture may comprise one or more movements by the robot 104, components thereof, or a combination thereof. The trigger conditions 156 specify one or more conditions which trigger the performance of a non-verbal cuing gesture. For example, the trigger conditions 156 may specify detection of a wakeword, an instruction to move the robot 104, and so forth. Once a trigger has been determined, the gesture data 158 may be used to find the corresponding gesture. The gesture data 158 may comprise one or more instructions, that when executed, direct the robot 104 to perform one or more gestures. For example, the gesture data 158 may comprise instructions that, when executed by one or more actuator controllers, cause the moveable component 128 to move, cause the robot 104 to move, cause the mast 114 to move, and so forth. The trigger conditions 156 and gesture data 158 are discussed in more detail below with regard to FIG. 6.

During operation, the robot 104 may access preference data 160. The preference data 160 may indicate preferences associated with a particular geographic region, physical address, user 102, and so forth. For example, a particular user 102 may prefer a very slight change in the movement of the moveable component 128 while performing a nodding behavior, while another user 102 may prefer a larger range of motion to improve visibility of the gesture. In other implementations, other preferences may be specified.

The robot 104 may include a motor controller that uses instructions from the autonomous navigation module 142 to control the motors of the robot 104, turning the wheels 136, and moving the robot 104.

The robot 104 may use the network interfaces 110 to connect to a network 162. For example, the network 162 may comprise a wireless local area network, that in turn is connected to a wide area network such as the Internet.

The robot 104 may be configured to dock or connect to a docking station 164. The docking station 164 may also be connected to the network 162. For example, the docking station 164 may be configured to connect to the wireless local area network such that the docking station 164 and the robot 104 may communicate. The docking station 164 may provide external power which the robot 104 may use to charge the battery 106.

The robot 104 may access one or more servers 166 via the network 162. For example, the robot 104 may utilize a wake word detection module to determine if the user 102 is addressing a request to the robot 104. The wake word detection module may hear a specified word or phrase and transition the robot 104 or portion thereof to the wake operating mode. Once in the wake mode, the robot 104 may then transfer at least a portion of the audio spoken by the user 102 to one or more servers 166 for further processing. The servers 166 may process the spoken audio and return to the robot 104 data that may be subsequently used to operate the robot 104.

The robot 104 may also communicate with other devices 168. The other devices 168 may include home automation controls, sensors, and so forth that are within the home or associated with operation of one or more devices in the home. For example, the other devices 168 may include a doorbell camera, a garage door, a refrigerator, a washing machine, a network connected microphone, and so forth. In some implementations, the other devices 168 may include other robots 104, vehicles, and so forth.

In other implementations, other types of autonomous mobile devices (AMD) may use the systems and techniques described herein. For example, the AMD may comprise an autonomous ground vehicle that is moving on a street, an autonomous aerial vehicle in the air, autonomous marine vehicle, and so forth.

Figure 2:
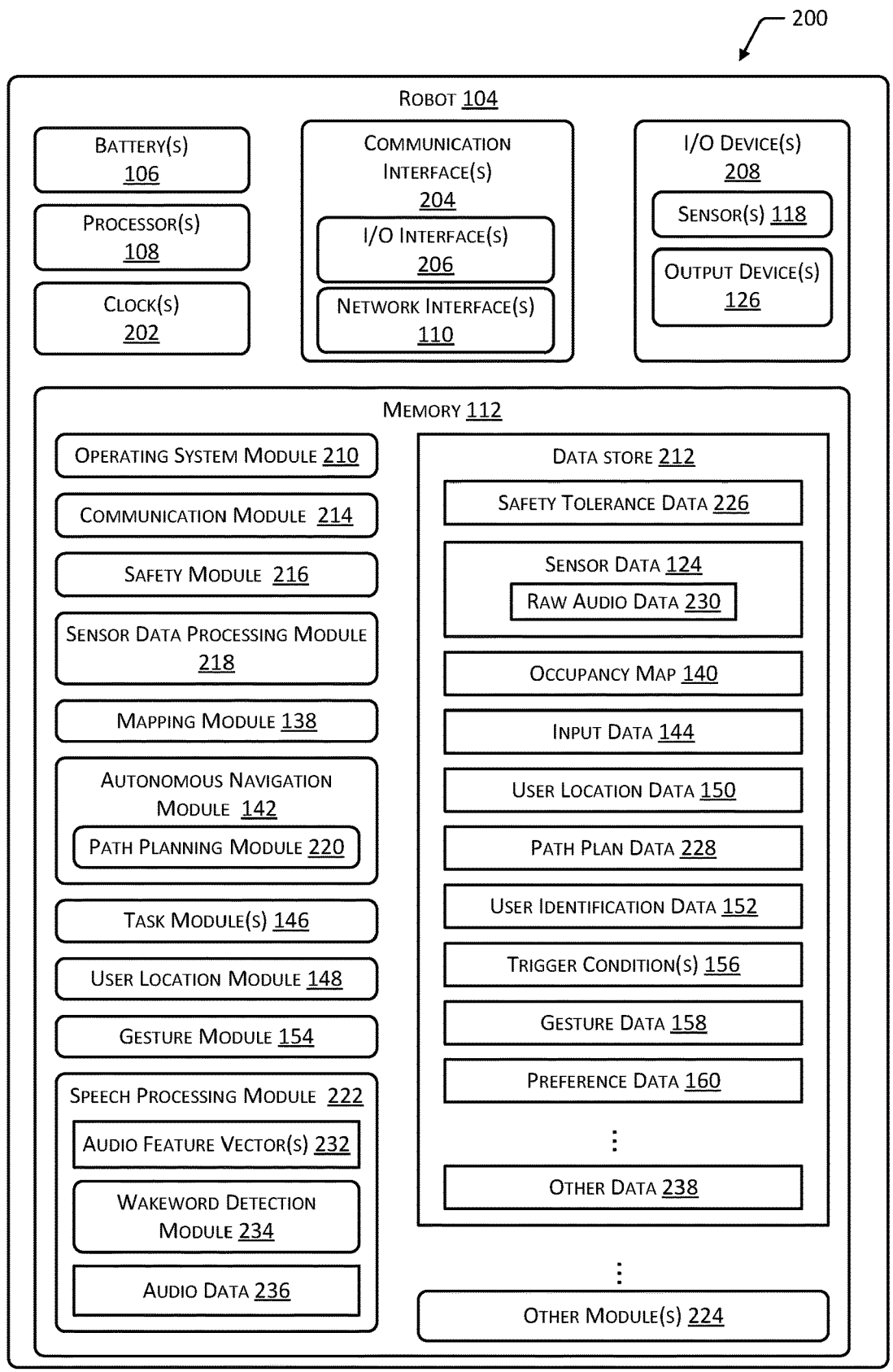
FIG. 2 is a block diagram of the components of the autonomous mobile device, according to some implementations.

FIG. 2 is a block diagram 200 of the robot 104, according to some implementations. The robot 104 may include one or more batteries 106 to provide electrical power suitable for operating the components in the robot 104. In some implementations, other devices may be used to provide electrical power to the robot 104. For example, power may be provided by wireless power transfer, capacitors, fuel cells, storage flywheels, and so forth.

The robot 104 may include one or more hardware processors 108 (processors) configured to execute one or more stored instructions. The processors 108 may comprise one or more cores. The processors 108 may include microcontrollers, systems on a chip, field programmable gate arrays, digital signal processors, graphic processing units, general processing units, and so forth. One or more clocks 202 may provide information indicative of date, time, ticks, and so forth. For example, the processor 108 may use data from the clock 202 to associate a particular interaction with a particular point in time.

The robot 104 may include one or more communication interfaces 204 such as input/output (I/O) interfaces 206, network interfaces 110, and so forth. The communication interfaces 204 enable the robot 104, or components thereof, to communicate with other devices 168 or components. The communication interfaces 204 may include one or more I/O interfaces 206. The I/O interfaces 206 may comprise Inter-Integrated Circuit (I2C), Serial Peripheral Interface (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 118, keyboard, mouse, scanner, and so forth. The I/O devices 208 may also include output devices 126 such as one or more of a motor, light, speaker, display, projector, printer, and so forth. In some embodiments, the I/O devices 208 may be physically incorporated with the robot 104 or may be externally placed.

The network interfaces 110 may be configured to provide communications between the robot 104 and other devices 168 such as other robots 104, a docking station 164, routers, access points, and so forth. The network interfaces 110 may include devices configured to couple to personal area networks (PANs), local area networks (LANs), wireless local area networks (WLANS), wide area networks (WANs), and so forth. For example, the network interfaces 110 may include devices compatible with Ethernet, Wi-Fi, Bluetooth, Bluetooth Low Energy, ZigBee, and so forth.

The robot 104 may also include one or more buses or other internal communications hardware or software that allow for the transfer of data between the various modules and components of the robot 104.

As shown in FIG. 2, the robot 104 includes one or more memories 112. The memory 112 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 112 provides storage of computer-readable instructions, data structures, program modules, and other data for the operation of the robot 104. A few example functional modules are shown stored in the memory 112, although the same functionality may alternatively be implemented in hardware, firmware, or as a system on a chip (SoC).

The memory 112 may include at least one operating system (OS) module 210. The OS module 210 is configured to manage hardware resource devices such as the I/O interfaces 206, the I/O devices 208, the communication interfaces 204, and provide various services to applications or modules executing on the processors 108. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the Robot Operating System (ROS), and so forth.

Also stored in the memory 112 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 168 including other robots 104, servers 166, network attached storage devices, and so forth.

A communication module 214 may be configured to establish communication with other devices 168, such as other robots 104, an external server 166, a docking station 164, and so forth. The communications may be authenticated, encrypted, and so forth.

Other modules within the memory 112 may include a safety module 216, a sensor data processing module 218, an autonomous navigation module 142, a path planning module 220, the one or more task modules 146, the user location module 148, a speech processing module 222, or other modules 224. The modules may access data stored within the data store 212, such as safety tolerance data 226, sensor data 124, or other data 238.

The safety module 216 may access safety tolerance data 226 to determine within what tolerances the robot 104 may operate safely within the physical environment. For example, the safety module 216 may be configured to stop the robot 104 from moving when the extensible mast 114 is extended. In another example, the safety tolerance data 226 may specify a minimum sound threshold which, when exceeded, stops all movement of the robot 104. Continuing this example, detection of sound such as a human yell would stop the robot 104. In another example, the safety module 216 may access safety tolerance data 226 that specifies a minimum distance from an object that the robot 104 is to maintain. Continuing this example, when a sensor 118 detects an object has approached to less than the minimum distance, all movement of the robot 104 may be stopped. Movement of the robot 104 may be stopped by one or more of inhibiting operations of one or more of the motors, issuing a command to stop motor operation, disconnecting power from one or more of the motors, and so forth. The safety module 216 may be implemented as hardware, software, or a combination thereof.

The safety module 216 may control other factors, such as a maximum speed of the robot 104 based on information obtained by the sensors 118, precision and accuracy of the sensor data 124, and so forth. For example, detection of an object by an optical sensor may include some error, such as when the distance to an object comprises a weighted average between the object and a background. As a result, the maximum speed permitted by the safety module 216 may be based on one or more factors such as the weight of the robot 104, nature of the floor, distance to object, and so forth. In the event that the maximum permissible speed differs from the maximum speed permitted by the safety module 216, the lesser speed may be utilized.

The sensor data processing module 218 may access sensor data 124 that is acquired from one or more the sensors 118. The sensor data processing module 218 may provide various processing functions such as de-noising, filtering, change detection, and so forth. Processing of sensor data 124, such as images from a camera sensor, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia. In another implementation, functions available in the OKAO machine vision library as promulgated by Omron Corporation of Kyoto, Japan, may be used to process the sensor data 124. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 124 or other data 238. For example, the ANN may be a trained using a supervised learning algorithm such that object identifiers are associated with images of particular objects within training images provided to the ANN. Once trained, the ANN may be provided with the sensor data 124 and produce output indicative of the object identifier.

The autonomous navigation module 142 provides the robot 104 with the ability to navigate within the physical environment without real-time human interaction. The autonomous navigation module 142 may implement, or operate in conjunction with, the mapping module 138 to determine the occupancy map 140 or other representation of the physical environment. In one implementation, the mapping module 138 may use one or more simultaneous localization and mapping ("SLAM") techniques. The SLAM algorithms may utilize one or more of maps, algorithms, beacons, or other techniques to provide navigational data. The navigational data may then be used to determine the path plan data 228 which is then subsequently used to determine a set of commands that drive the motors connected to the wheels 136. For example, the autonomous navigation module 142 may determine a location within the environment, estimate a path to a destination, and so forth.

A path planning module 220 may be part of, or operate in conjunction with, the autonomous navigation module 142. During operation, the autonomous navigation module 142 may use the occupancy map 140, the user location data 150, the gesture data 158, preference data 160, and so forth to determine path plan data 228. For example, the autonomous navigation module 142 may determine a current location of the robot 104 and determine an overall course that the robot 104 is to follow to perform a task, while the path planning module 220 handles a portion of that course that is proximate to the robot 104. Continuing the example, the path planning module 220 may be used to determine a course from the robot's 104 current location to a first waypoint elsewhere in the room that was determined by the autonomous navigation module 142.

The path planning module 220 may determine path plan data 228 at specified intervals, upon receipt of data indicative of a change, and so forth. For example, the path planning module 220 may determine path plan data 228 at a specified interval, such as every 200 ms, or every meter. Appearance of an obstacle may result in determination of path plan data 228 outside of the specified interval. A user trajectory module may also determine predicted trajectory data at specified intervals, upon a change in location of the user 102, and so forth.

In some implementations, the path planning module 220 may generate a plurality of possible paths to a waypoint, and then score or rank those paths. A highest scoring path, deemed to be most suitable, may then be selected and used as the path plan data 228. For example, the ranking may be based on the sum of the combined values of the obstacle cost values, and so forth for the areas or cells that are traversed by the possible path. In other implementations, the ranking may be based on time to arrive.

The path plan data 228 may be subsequently used to direct the movement of the robot 104. For example, the path plan data 228 may comprise a series of control instructions that are configured to be processed by a motor controller. These control instructions may comprise data indicative of a rotation rate of one or more motors, a duration of rotation, a total number of rotations of the one or more motors, and so forth. For example, the control instructions may instruct the motor controller to operate a first motor on a left side of the robot 104 at a rate of 10.0 radians per second (rad/s) for 5 seconds and a second motor on a right side of the robot 104 at a rate of 9.7 rad/s for 5 seconds.

The autonomous navigation module 142 may include an obstacle avoidance module. For example, if an obstacle is detected along a planned path, the obstacle avoidance module may re-route the robot 104 to move around the obstacle or take an alternate path.

The occupancy map 140 may be manually or automatically determined. During a learning phase the user 102 may take the robot 104 on a tour of the environment, allowing the robot 104 to generate the occupancy map 140 and associated data, such as tags designating a particular room, such as "kitchen" or "bedroom". In another example, during subsequent operation the robot 104 may generate the occupancy map 140 that is indicative of locations of obstacles such as chairs, doors, stairwells, and so forth as it moves unattended through the environment.

In some implementations, the occupancy map 140 may include floor characterization data. The floor characterization data is indicative of one or more attributes of the floor at a particular location within the physical environment. During operation of the robot 104, floor characterization data may be obtained. The floor characterization data may be utilized by one or more of safety module 216, the autonomous navigation module 142, the task module 146, or other modules 224. For example, the floor characterization data may be used to determine if an unsafe condition occurs such as a wet floor. In another example, the floor characterization data may be used by the autonomous navigation module 142 to assist in the determination of the current location of the robot 104 within the home. For example, if the autonomous navigation module 142 determines that the robot 104 is located in the dining room, but the floor characterization data indicates that the floor is consistent with the living room, an error condition may be generated in which other techniques are used to determine the location of the robot 104 or otherwise resolve the difference. For example, the robot 104 may attempt to return to the docking station 164 and then, using information about the path traveled, determine the previously ambiguous location within the home.

The floor characterization data may include one or more of a location designator, floor type, floor texture, coefficient of friction, surface resistivity, color, and so forth. The location designator may be specified based on input from the user 102. For example, the robot 104 may use speech synthesis to ask the user 102 "what room is this?" during a training phase. The utterance of the user may be received by a microphone array and the audio data "this is the living room" may be processed and subsequently used to generate the location designator.

The autonomous navigation module 142 may be used to move the robot 104 from a first location to a second location within the physical environment. This movement may be responsive to a determination made by an onboard processor 108, in response to a command received via one or more communication interfaces 204 or a sensor 118, and so forth. For example, an external server 166 may send a command that is subsequently received using a network interface 110. This command may direct the robot 104 to proceed to a designated destination, such as "living room" or "dining room". The robot 104 may then process this command, and use the autonomous navigation module 142 to determine the directions and distances associated with reaching the specified destination.

The memory 112 may store one or more task modules 146. The task module 146 comprises instructions that, when executed, provide one or more functions associated with a particular task. A task may have triggers with corresponding gestures.

Tasks may involve a single behavior. In one example, the task may comprise a security or sentry task in which the robot 104 travels throughout the physical environment avoiding users 102 and looking for events that exceed predetermined thresholds. In the sentry task, the trigger may be detection of a user 102 within a threshold distance while the gesture comprises performing a "nodding" motion by tilting the moveable component 128 up and down. In another example, the task may comprise a "follow me" feature in which the robot 104 follows a user 102 using a follow behavior. For example, the user 102 may participate in a video call using the robot 104. The camera 122 on the mast 114 may be used to acquire video for transmission while the display 130 is used to present video that is received. The robot 104 may use data from one or more sensors 118 to determine a location of the user 102 relative to the robot 104, and track and follow the user 102. In one implementation, computer vision techniques may be used to locate the user 102 within image data acquired by the cameras 122. In another implementation, the user's voice may be detected by an array of microphones 120, and a direction to the voice with respect to the robot 104 may be established. Other techniques may be utilized either alone or in combination to allow the robot 104 to track a user 102, follow a user 102, or track and follow a user 102. The path of the robot 104 as it follows the user 102 may be based at least in part on one or more of constraint cost values. For example, while the robot 104 is following the user 102 down the hallway, the robot 104 may stay to the right side of the hallway. In some situations, while following a user 102 the robot 104 may disregard some rules or may disregard the speed values for a particular area. For example, while following the user 102 the robot 104 may not slow down while passing a doorway.

In yet another example, the task may allow for the robot 104 to be summoned to a particular location. The user 102 may utter a voice command that is heard by a microphone 120 on the robot 104, a microphone in a smart phone, or another device with a microphone such as a network enabled speaker or television. While performing this task, the robot 104 may utilize an avoid behavior until it reaches the particular location.

Alternatively, the user 102 may issue a command using an app on a smartphone, wearable device, tablet, or other computing device. Given that the location of the device at which the command was obtained is known, the robot 104 may be dispatched to that location. If the location is unknown, the robot 104 may search for the particular user 102, utilizing an avoid behavior with respect to other users and an approach behavior for the particular user.

As described above, the user location module 148 may provide user location data 150 indicative of a location of a user 102. In some implementations, user identification data 152 may also be determined.

The gesture module 154 is configured to determine the satisfaction of one or more trigger conditions 156. When a trigger condition 156 has been determined to be satisfied, the gesture data 158 may be used to generate specific instructions that, when executed, cause the robot 104 to perform the gesture. The gesture module 154 may use as input the sensor data 124, input data 144, data associated with operation of the robot 104, and so forth. For example, the gesture module 154 may receive user location data 150 that is based on sensor data 124 indicating the user 102 is within a threshold distance, satisfying a trigger condition 156. The corresponding gesture data 158 may be retrieved, and the instructions executed to perform a nodding behavior with the moveable component 128. In another example, the gesture module 154 may determine that no task is in progress and interaction with the user 102 is concluded, satisfying a trigger condition 156. The corresponding gesture data 158 may be retrieved, directing the robot 104 to move the moveable component 128 so it is directed away from the user 102 and then after some interval of time, the robot 104 moves away.

In some implementations, the gesture module 154 may be configured to limit performance of gestures to situations in which a user 102 is within a threshold distance or within line of sight of the robot 104. For example, if the threshold distance is 3 meters and the user 102 is 2.5 meters from the robot 104, a gesture may be performed. In another example, if no user 102 is determined to be present, the gesture module 154 may discontinue presentation of gestures by the robot 104.

The speech processing module 222 may be used to process utterances of the user 102. Microphones 120 may acquire audio in the presence of the robot 104 and may send raw audio data 230 to an acoustic front end (AFE). The AFE may transform the raw audio data 230 (for example, a single-channel, 16-bit audio stream sampled at 16 kHz), captured by the microphone 120, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the robot 104 for output. For example, the robot 104 may be playing music or other audio that is being received from a network 162 in the form of output audio data. To avoid the output audio interfering with the device's ability to detect and process input audio, the AFE or other component may perform echo cancellation to remove the output audio data from the input raw audio data 230, or other operations.

The AFE may divide the audio data into frames representing time intervals for which the AFE determines a number of values (i.e., features) representing qualities of the raw audio data 230, along with a set of those values (i.e., a feature vector or audio feature vector 232) representing features/qualities of the raw audio data 230 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other embodiments, the robot 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio data to one or more acoustic models in speech storage, which acoustic models may include models corresponding to speech, noise (such as environmental noise or background noise), or silence. Still other techniques may be used to determine whether speech is present in the audio data.

Once speech is detected in the audio received by the robot 104 (or separately from speech detection), the robot 104 may use the wakeword detection module 234 to perform wakeword detection to determine when a user 102 intends to speak a command to the robot 104. This process may also be referred to as keyword detection, with the wakeword being a specific example of a keyword. Specifically, keyword detection is typically performed without performing linguistic analysis, textual analysis, or semantic analysis. Instead, incoming audio (or audio data 236) is analyzed to determine if specific characteristics of the audio match preconfigured acoustic waveforms, audio signatures, or other data to determine if the incoming audio "matches" stored audio data corresponding to a keyword.

Thus, the wakeword detection module 234 may compare audio data 236 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local robot 104 may "wake" and begin transmitting audio data 236 (which may include one or more audio feature vectors 232 or the raw audio data 230) to one or more server(s) 166 for speech processing. The audio data 236 corresponding to audio obtained by the microphone 120 may be sent to a server 166 for routing to a recipient device or may be sent to the server 166 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local robot 104 prior to sending.

The robot 104 may connect to the network 162 using one or more of the network interfaces 110. One or more servers 166 may provide various functions, such as ASR, natural language understanding (NLU), providing content such as audio or video to the robot 104, and so forth.

The other modules 224 may provide other functionality, such as object recognition, speech synthesis, user identification, and so forth. For example, an automated speech recognition (ASR) module may accept as input raw audio data 230 or audio feature vectors 232 and may produce as output a text string that is further processed and used to provide input, command a task module 146, and so forth. In one implementation, the text string may be sent via a network 162 to a server 166 for further processing. The robot 104 may receive a response from the server 166 and present output, perform an action, and so forth. For example, the raw audio data 230 may include the user saying "robot, go to the dining room". The audio data 236 representative of this utterance may be sent to the server 166 that returns commands directing the robot 104 to the dining room of the home associated with the robot 104.

The utterance may result in a response from the server 166 that directs operation of other devices 168 or services. For example, the user 102 may say "robot, wake me at seven tomorrow morning". The audio data 236 may be sent to the server 166 that determines the intent and generates commands to instruct a device attached to the network 162 to play an alarm at 7:00 am the next day.

The other modules 224 may comprise a speech synthesis module that is able to convert text data to human speech. For example, the speech synthesis module may be used by the robot 104 to provide speech that a user 102 is able to understand.

The data store 212 may store other data 238 such as localization settings, user identifier data, and so forth.

Figure 3:
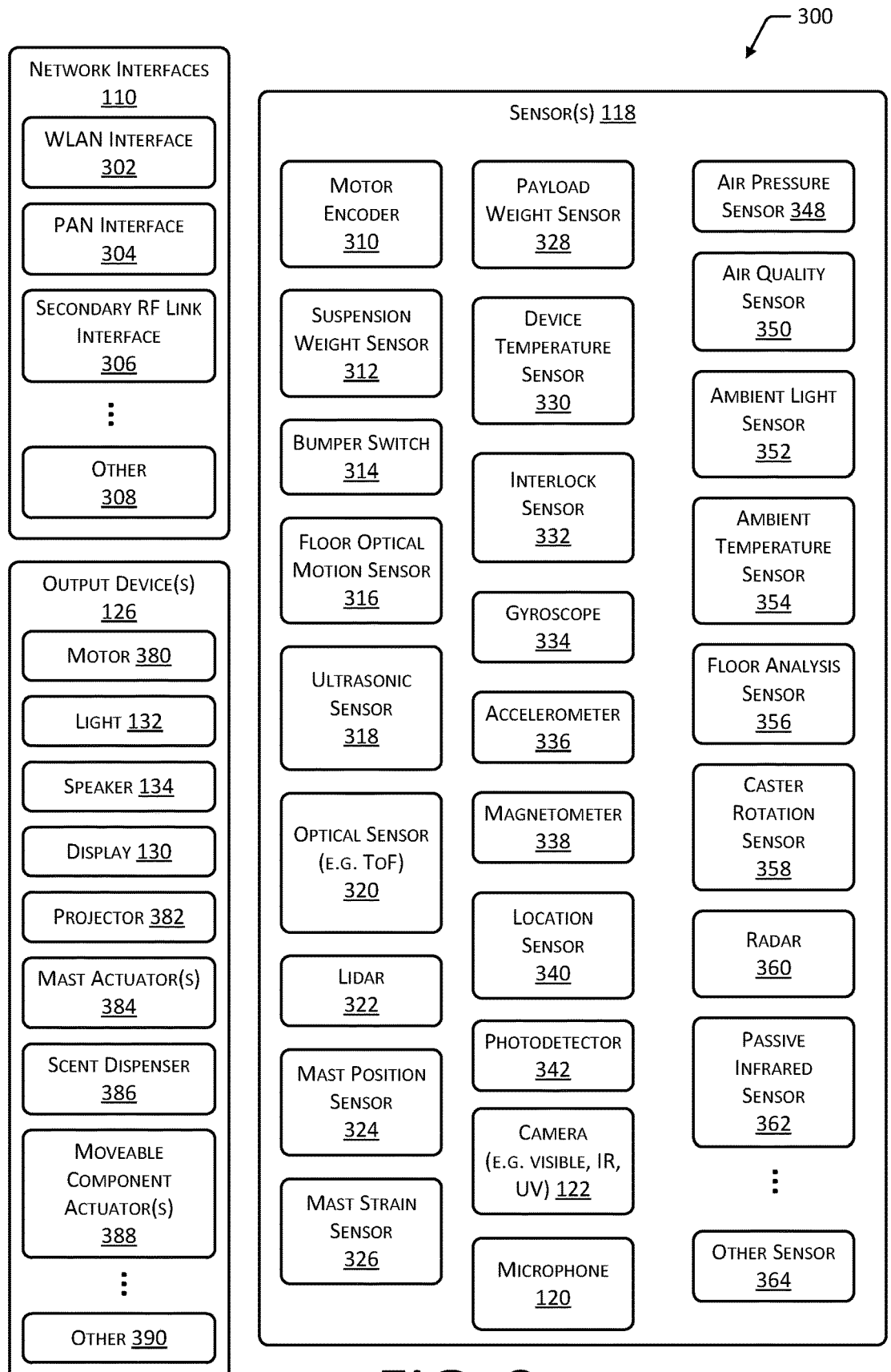
FIG. 3 is a block diagram of some components of the autonomous mobile device such as network interfaces, sensors, and output devices, according to some implementations.

FIG. 3 is a block diagram 300 of some components of the robot 104 such as network interfaces 110, sensors 118, and output devices 126, according to some implementations. The components illustrated here are provided by way of illustration and not necessarily as a limitation. For example, the robot 104 may utilize a subset of the particular network interfaces 110, output devices 126, or sensors 118 depicted here, or may utilize components not pictured. One or more of the sensors 118, output devices 126, or a combination thereof may be included on a moveable component 128 that may be panned, tilted, rotated, or any combination thereof with respect to a chassis of the robot 104. The chassis of the robot 104 has a front and a back. The moveable component 128 may be attached to, and extend away from, the front of the chassis. For example, the moveable component 128 may be attached via a support structure to a front or leading edge of the chassis or a portion thereof.

The network interfaces 110 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the robot 104 and other devices 168 in the event that communication fails using one or more of the WLAN interface 302 or the PAN interface 304. For example, in the event the robot 104 travels to an area within the physical environment that does not have Wi-Fi coverage, the robot 104 may use the secondary RF link interface 306 to communicate with another device such as a specialized access point, docking station 164, or other robot 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The robot 104 may include one or more of the following sensors 118. The sensors 118 depicted here are provided by way of illustration and not necessarily as a limitation. It is understood other sensors 118 may be included or utilized by the robot 104, while some sensors 118 may be omitted in some configurations.

A motor encoder 310 provides information indicative of the rotation or linear extension of a motor 380. The motor 380 may comprise a rotary motor, or a linear actuator. In some implementations, the motor encoder 310 may comprise a separate assembly such as a photodiode and encoder wheel that is affixed to the motor 380. In other implementations, the motor encoder 310 may comprise circuitry configured to drive the motor 380. For example, the autonomous navigation module 142 may utilize the data from the motor encoder 310 to estimate a distance traveled.

A suspension weight sensor 312 provides information indicative of the weight of the robot 104 on the suspension system for one or more of the wheels 136 or the caster. For example, the suspension weight sensor 312 may comprise a switch, strain gauge, load cell, photodetector 342, or other sensing element that is used to determine whether weight is applied to a particular wheel 136, or whether weight has been removed from the wheel 136. In some implementations, the suspension weight sensor 312 may provide binary data such as a "1" value indicating that there is a weight applied to the wheel 136, while a "0" value indicates that there is no weight applied to the wheel 136. In other implementations, the suspension weight sensor 312 may provide an indication such as so many kilograms of force or newtons of force. The suspension weight sensor 312 may be affixed to one or more of the wheels 136 or the caster. In some situations, the safety module 216 may use data from the suspension weight sensor 312 to determine whether or not to inhibit operation of one or more of the motors 380. For example, if the suspension weight sensor 312 indicates no weight on the suspension, the implication is that the robot 104 is no longer resting on its wheels 136, and thus operation of the motors 380 may be inhibited. In another example, if the suspension weight sensor 312 indicates weight that exceeds a threshold value, the implication is that something heavy is resting on the robot 104 and thus operation of the motors 380 may be inhibited.

One or more bumper switches 314 provide an indication of physical contact between a bumper or other member that is in mechanical contact with the bumper switch 314. The safety module 216 utilizes sensor data 124 obtained by the bumper switches 314 to modify the operation of the robot 104. For example, if the bumper switch 314 associated with the front of the robot 104 is triggered, the safety module 216 may drive the robot 104 backwards.

A floor optical motion sensor (FOMS) 316 provides information indicative of motions of the robot 104 relative to the floor or other surface underneath the robot 104. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 may utilize sounds in excess of 20 kHz to determine a distance from the sensor 118 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 be utilized in conjunction with one another to determine a location within a two-dimensional plane of the object.

In some implementations, the ultrasonic sensor 318 or portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 124 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 118 such as an image sensor or camera 122. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, safety module 216 and the autonomous navigation module 142 may utilize the sensor data 124 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight a distance to that particular point, sensor data 124 may be generated that is indicative of the presence of objects and the relative positions, shapes, and so forth is visible to the lidar 322. Data from the lidar 322 may be used by various modules. For example, the autonomous navigation module 142 may utilize point cloud data generated by the lidar 322 for localization of the robot 104 within the physical environment.

A mast position sensor 324 provides information indicative of a position of the mast 114. For example, the mast position sensor 324 may comprise limit switches associated with the mast extension mechanism that indicate whether the mast 114 is in an extended or retracted position. In other implementations, the mast position sensor 324 may comprise an optical code on at least a portion of the mast 114 that is then interrogated by an optical emitter and a photodetector 342 to determine the distance which the mast 114 is extended. In another implementation, the mast position sensor 324 may comprise an encoder wheel that is attached to a mast motor that is used to raise or lower the mast 114. The mast position sensor 324 may provide data to the safety module 216. For example, if the robot 104 is preparing to move, data from the mast position sensor 324 may be checked to determine if the mast 114 is retracted, and if not, the mast 114 may be retracted prior to beginning movement.

A mast strain sensor 326 provides information indicative of a strain on the mast 114 with respect to the remainder of the robot 104. For example, the mast strain sensor 326 may comprise strain gauge or load cell that measures a side-load applied to the mast 114 or a weight on the mast or downward pressure on the mast 114. The safety module 216 may utilize sensor data 124 obtained by the mast strain sensor 326. For example, if the strain applied to the mast 114 exceeds a threshold amount, the safety module 216 may direct an audible and visible alarm to be presented by the robot 104.

A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the robot 104. The device temperature sensors 330 provide temperature data of one or more components within the robot 104. For example, a device temperature sensor 330 may indicate a temperature of one or more of the batteries 106, one or more motors 380, and so forth. In the event the temperature exceeds a threshold value, the component associated with that device temperature sensor 330 may be shut down.

One or more interlock sensors 332 may provide data to the safety module 216 or other circuitry that prevents the robot 104 from operating in an unsafe condition. For example, the interlock sensors 332 may comprise switches that indicate whether an access panel is open. The interlock sensors 332 may be configured to inhibit operation of the robot 104 until the interlock switch indicates a safe condition is present.

A gyroscope 334 may provide information indicative of rotation of an object affixed thereto. For example, gyroscope 334 may generate sensor data 124 that is indicative of a change in orientation of the robot 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The robot 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 124 indicative of impinging light. For example, the photodetector 342 may provide data indicative of a color, intensity, duration, and so forth.

A camera 122 generates sensor data 124 indicative of one or more images. The camera 122 may be configured to detect light in one or more wavelengths including, but not limited to, terahertz, infrared, visible, ultraviolet, and so forth. For example, an infrared camera 122 may be sensitive to wavelengths between approximately 700 nanometers and 1 millimeter. The camera 122 may comprise charge coupled devices (CCD), complementary metal oxide semiconductor (CMOS) devices, microbolometers, and so forth. The robot 104 may use image data acquired by the camera 122 for object recognition, navigation, collision avoidance, user communication, and so forth. For example, a pair of cameras 122 sensitive to infrared light may be mounted on the front of the robot 104 to provide binocular stereo vision, with the sensor data 124 comprising images being sent to the autonomous navigation module 142. In another example, the camera 122 may comprise a 10 mega pixel or greater camera that is used for videoconferencing or for acquiring pictures for the user 102.

The camera 122 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 122, particularly those associated with navigation or autonomous operation, may utilize a global shutter. In other implementations, the camera(s) 122 providing images for use by the autonomous navigation module 142 may be acquired using a rolling shutter and subsequently may be processed to mitigate image artifacts.

One or more microphones 120 may be configured to acquire information indicative of sound present in the physical environment. In some implementations, arrays of microphones 120 may be used. These arrays may implement beamforming techniques to provide for directionality of gain. The robot 104 may use the one or more microphones 120 to acquire information from acoustic tags, accept voice input from users 102, determine ambient noise level, for voice communication with another user 102 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as a photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, duration of ambient lighting around the robot 104.

An ambient temperature sensor 354 provides information indicative of the temperature of the ambient environment proximate to the robot 104. In some implementations, an infrared temperature sensor may be utilized to determine the temperature of another object at a distance.

A floor analysis sensor 356 may include one or more components that are used to generate at least a portion of the floor characterization data. In one implementation, floor analysis sensor 356 may comprise circuitry that may be used to determine one or more of the electrical resistance, electrical inductance, or electrical capacitance of the floor. For example, two or more of the wheels 136 in contact with the floor may include an allegedly conductive pathway between the circuitry and the floor. By using two or more of these wheels 136, the circuitry may measure one or more of the electrical properties of the floor. Information obtained by the floor analysis sensor 356 may be used by one or more of the safety module 216, the autonomous navigation module 142, the task module 146, and so forth. For example, if the floor analysis sensor 356 determines that the floor is wet, the safety module 216 may decrease the speed of the robot 104 and generate a notification alerting the user 102.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster 402 transitioned from an angle of 0° at a first time to 49° at a second time.

The sensors 118 may include a radar 360. The radar 360 may be used to provide information as to a distance, lateral position, and so forth, to an object.

The sensors 118 may include a passive infrared (PIR) sensor 362. The PIR sensor 362 may be used to detect the presence of people, pets, hotspots, and so forth. For example, the PIR sensor 362 may be configured to detect infrared radiation with wavelengths between 8 and 14 micrometers.

The robot 104 may include other sensors 364 as well. For example, a capacitive proximity sensor may be used to provide proximity data to adjacent objects. Other sensors 364 may include radio frequency identification (RFID) readers, near field communication (NFC) systems, coded aperture camera, and so forth. For example, NFC tags may be placed at various points within the physical environment to provide landmarks for the autonomous navigation module 142. One or more touch sensors may be utilized to determine contact with a user 102 or other objects.

The robot 104 may include one or more output devices 126. A motor 380 may be used to provide linear or rotary motion. A light 132 may be used to emit photons. A speaker 134 may be used to emit sound. A display 130 may comprise one or more of a liquid crystal display, light emitting diode display, electrophoretic display, cholesterol display, interferometric display, and so forth. The display 130 may be used to present visible information such as graphics, pictures, text, and so forth. In some implementations, the display 130 may comprise a touchscreen that combines a touch sensor and a display 130.

In some implementations, the robot 104 may be equipped with a projector 382. The projector 382 may be able to project an image on the surface, such as the floor, wall, ceiling, and so forth.

One or more mast actuators 384 may comprise one or more of a motor 380, linear actuator, pneumatic device, hydraulic device, and so forth. An actuator controller may be used to provide a signal or other input that operates one or more of the mast actuators 384 to produce movement of the mast 114. For example, the mast actuators 384 may be used to raise or lower at least a portion of the mast 114.

A scent dispenser 386 may be used to emit one or more smells. For example, the scent dispenser 386 may comprise a plurality of different scented liquids that may be evaporated or vaporized in a controlled fashion to release predetermined amounts of each.

One or more moveable component actuators 388 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 388 to produce movement of the moveable component 128.

In other implementations, other 390 output devices may be utilized. For example, the robot 104 may include a haptic output device that provides output that produces particular touch sensations to the user 102. Continuing the example, a motor 380 with an eccentric weight may be used to create a buzz or vibration to allow the robot 104 to simulate the purr of a cat.

Figure 4:
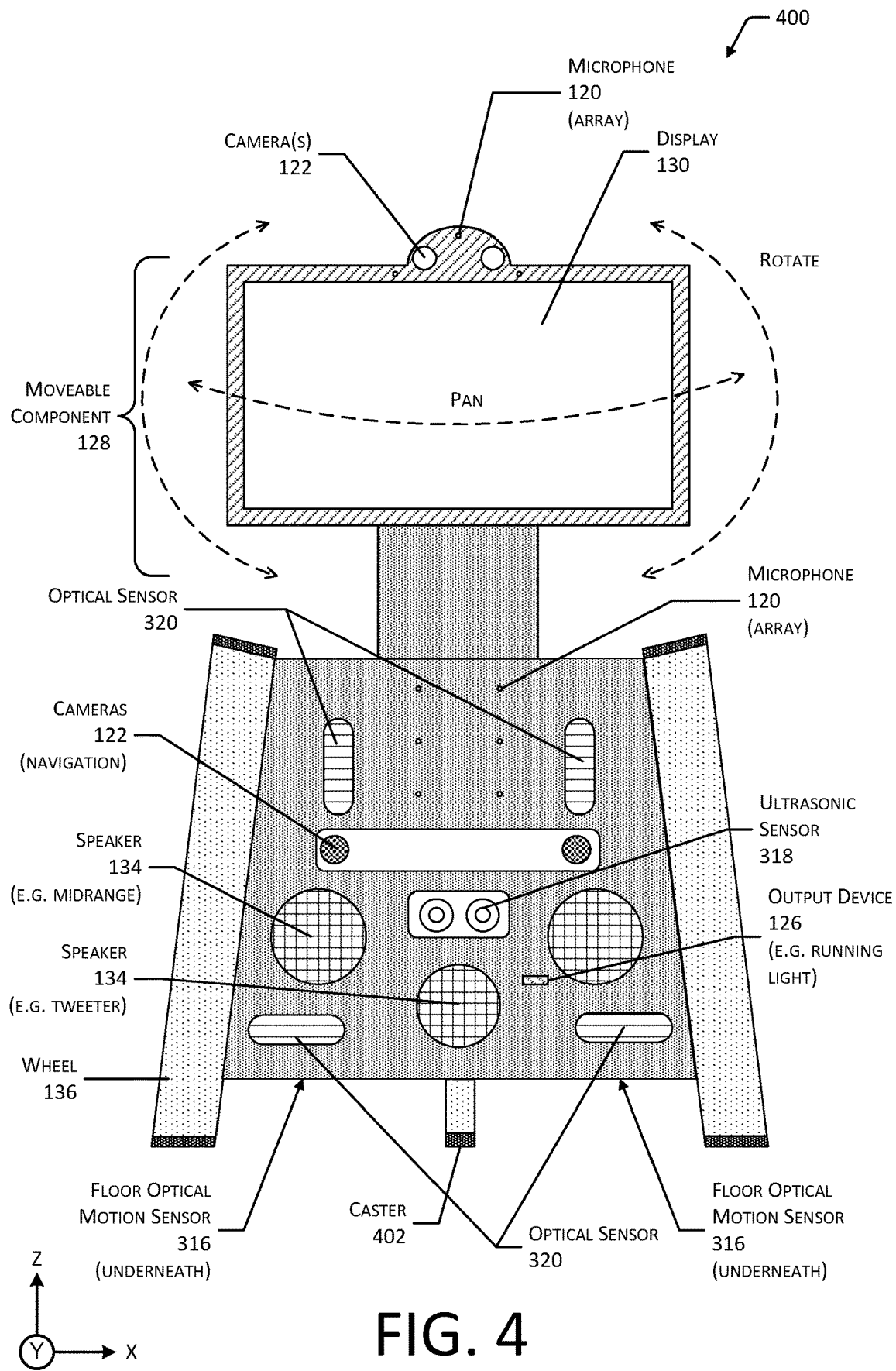
FIG. 4 is a front view of the autonomous mobile device, according to some implementations.

FIG. 4 is a front view 400 of the robot 104, according to some implementations. In this view, the wheels 136 are depicted on the left and right sides of a lower structure. As illustrated here, the wheels 136 are canted inwards towards an upper structure. In other implementations, the wheels 136 may be mounted vertically. A caster 402 is visible along the midline. The front section of the robot 104 includes a variety of sensors 118. A first pair of optical sensors 320 are located along the lower edge of the front while a second pair of optical sensors 320 are located along an upper portion of the front. Between the second set of the optical sensors 320 is a microphone 120 (array).

In some implementations, one or more microphones 120 may be arranged within or proximate to the display 130. For example, a microphone 120 array may be arranged within the bezel of the display 130.

A pair of cameras 122 separated by a distance are mounted to the front of the robot 104 and provide for stereo vision. The distance or "baseline" between the pair of cameras 122 may be between 5 and 15 centimeters (cm). For example, the pair of cameras 122 may have a baseline of 10 cm. In some implementations, these cameras 122 may exhibit a relatively wide horizontal field-of-view (HFOV). For example, the HFOV may be between 90° and 110°. A relatively wide FOV allows for easier detection of moving objects, such as users or pets that may be in the path of the robot 104. Also, the relatively wide FOV facilitates the robot 104 being able to detect objects when turning.

The sensor data 124 comprising images produced by this pair of cameras 122 can be used by the autonomous navigation module 142 for navigation of the robot 104. The cameras 122 used for navigation may be of different resolution from, or sensitive to different wavelengths than, cameras 122 used for other purposes such as video communication. For example, the navigation cameras 122 may be sensitive to infrared light allowing the robot 104 to operate in darkness, while the camera 122 mounted above the display 130 may be sensitive to visible light and is used to generate images suitable for viewing by a person. Continuing the example, the navigation cameras 122 may have a resolution of at least 300 kilopixels each while the camera 122 mounted above the display 130 may have a resolution of at least 10 megapixels. In other implementations, navigation may utilize a single camera 122.

The robot 104 may include the moveable component 128. In one implementation, the moveable component 128 may include the display 130 with cameras 122 arranged above the display 130. The cameras 122 may operate to provide stereoimages of the physical environment, the user 102, and so forth. For example, an image from each of the cameras 122 above the display 130 may be accessed and used to generate stereo image data about a face of a user 102. This stereoimage data may then be used for facial recognition, user identification, gesture recognition, gaze tracking, and so forth. In other implementations, a single camera 122 may be present above the display 130. In some implementations, the moveable component 128 may include one or more microphones 120.

The moveable component 128 is mounted on a movable mount that allows for movement with respect to the chassis of the robot 104. The movable mount may allow the moveable component 128 to be moved by the moveable component actuators 388 along one or more degrees of freedom. For example, the moveable component 128 may pan, tilt, and rotate as depicted here. The size of the moveable component 128 may vary. In one implementation, the display 130 in the moveable component 128 may be approximately 8 inches as measured diagonally from one corner to another.

An ultrasonic sensor 318 is also mounted on the front of the robot 104 and may be used to provide sensor data 124 that is indicative of objects in front of the robot 104.

One or more speakers 134 may be mounted on the robot 104. For example, pyramid range speakers 134 are mounted on the front of the robot 104 as well as a high range speaker 134 such as a tweeter. The speakers 134 may be used to provide audible output such as alerts, music, human speech such as during a communication session with another user, and so forth.

One or more bumper switches 314 (not shown) may be present along the front of the robot 104. For example, a portion of the housing of the robot 104 that is at the leading edge may be mechanically coupled to one or more bumper switches 314.

Other output devices 126, such as one or more lights 132, may be on an exterior of the robot 104. For example, a running light may be arranged on a front of the robot 104. The running light may provide light for operation of one or more of the cameras 122, a visible indicator to the user 102 that the robot 104 is in operation, and so forth.

One or more of the FOMS 316 are located on an underside of the robot 104.

Figure 5:
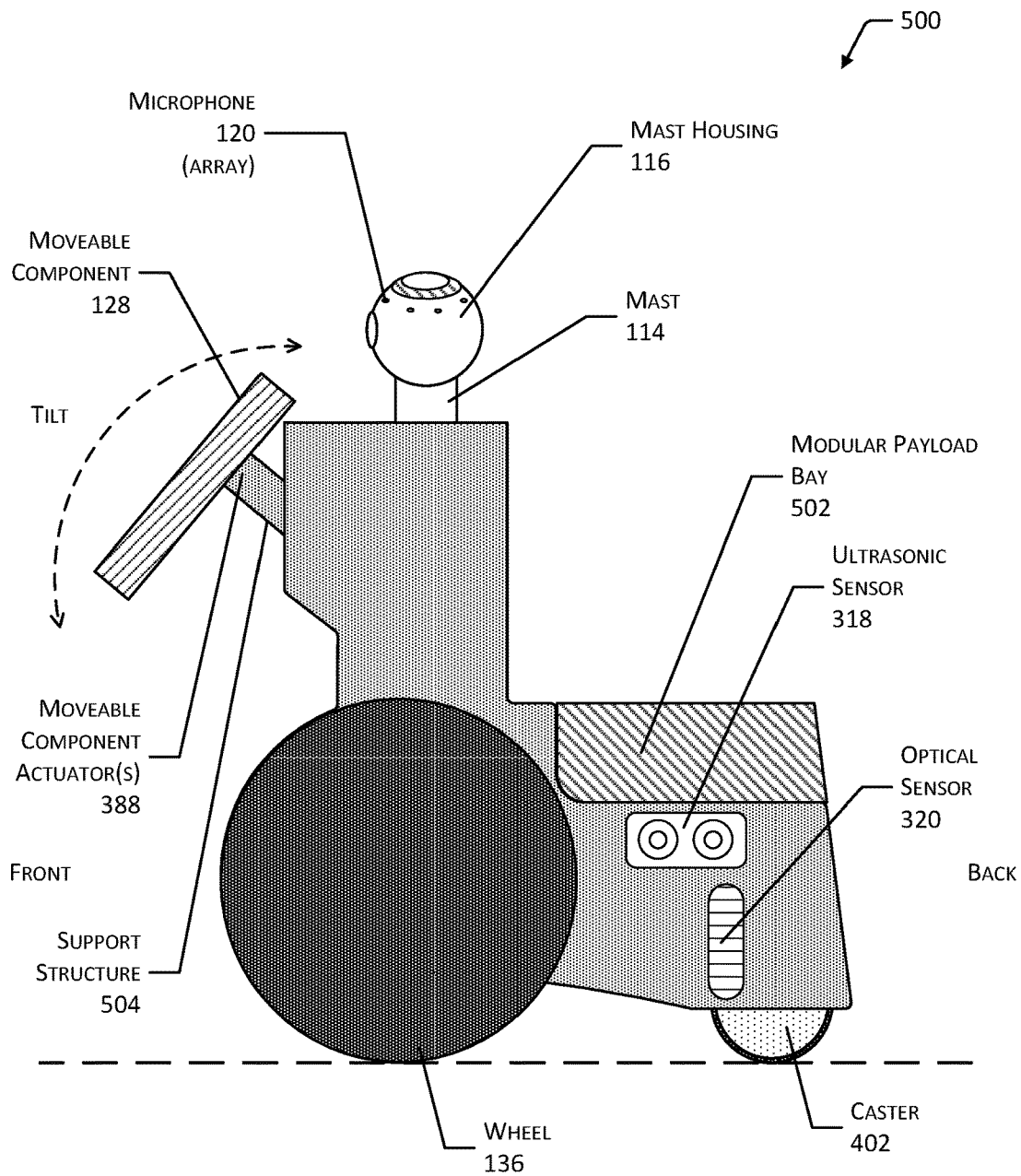
FIG. 5 is a side view of the autonomous mobile device, according to some implementations.

FIG. 5 is a side view 500 of the robot 104, according to some implementations.

The exterior surfaces of the robot 104 may be designed to minimize injury in the event of an unintended contact between the robot 104 and a user 102 or a pet. For example, the various surfaces may be angled, rounded, or otherwise designed to divert or deflect an impact. In some implementations, the housing of the robot 104, or a surface coating may comprise an elastomeric material or a pneumatic element. For example, the outer surface of the housing of the robot 104 may be coated with a viscoelastic foam. In another example, the outer surface of the housing of the robot 104 may comprise a shape-memory polymer that upon impact deforms but then over time returns to the original shape.

In this side view, the left side of the robot 104 is depicted. An ultrasonic sensor 318 and an optical sensor 320 are present on either side of the robot 104.

In this illustration, the caster 402 is shown in a trailing configuration, in which the caster 402 is located behind or aft of the axle of the wheels 136. In another implementation (not shown) the caster 402 may be in front of the axle of the wheels 136. For example, the caster 402 may be a leading caster 402 positioned forward of the axle of the wheels 136.

The robot 104 may include a modular payload bay 502 that is located within the lower structure. The modular payload bay 502 provides one or more of mechanical or electrical connectivity with the robot 104. For example, the modular payload bay 502 may include one or more engagement features such as slots, cams, ridges, magnets, bolts, and so forth that are used to mechanically secure an accessory within the modular payload bay 502. In one implementation, the modular payload bay 502 may comprise walls within which the accessory may sit. In another implementation, the modular payload bay 502 may include other mechanical engagement features such as slots into which the accessory may be slid and engaged.

The modular payload bay 502 may include one or more electrical connections. For example, the electrical connections may comprise a universal serial bus (USB) connection that allows for the transfer of data, electrical power, and so forth between the robot 104 and the accessory.

As described above, the robot 104 may incorporate a moveable component 128 that includes a display 130 which may be utilized to present visual information to the user 102.

In some implementations, the moveable component 128 may be located with or affixed to the upper structure. For example, as shown here the moveable component 128 may be mounted to a support structure 504 that extends away from a front of the chassis. In some implementations, the display 130 may comprise a touch screen that allows user input to be acquired. The moveable component 128 is mounted on a movable mount that allows motion along one or more axes. For example, the movable mount may allow the moveable component 128 to be panned, tilted, and rotated by the moveable component actuators 388. The moveable component 128 may be moved to provide a desired viewing angle to the user 102, to provide output from the robot 104, and so forth. For example, the output may comprise the moveable component 128 being tilted up and down to provide a gestural output equivalent to a human nodding their head, or panning to face the user 102 as described above.

The robot 104 may incorporate a mast 114. The mast 114 provides a location from which additional sensors 118 or output devices 126 may be placed at a higher vantage point. The mast 114 may be fixed or extensible. The extensible mast 114 is depicted in this illustration. The extensible mast 114 may be transitioned between a retracted state, an extended state, or placed at some intermediate value between the two.

At the top of the mast 114 may be a mast housing 116. In this illustration, the mast housing 116 is approximately spherical, however in other implementations other physical form factors such as cylinders, squares, or other shapes may be utilized.

The mast housing 116 may contain one or more sensors 118. For example, the sensors 118 may include a camera 122 having a field-of-view (FOV). In another example, the sensors 118 may include an optical sensor 320 to determine a distance to an object. The optical sensor 320 may look upward, and may provide information as to whether there is sufficient clearance above the robot 104 to deploy the mast 114. In another example, the mast housing 116 may include one or more microphones 120.

One or more output devices 126 may also be contained by the mast housing 116. For example, the output devices 126 may include a camera flash used to provide illumination for the camera 122, and an indicator light that provides information indicative of a particular operation of the robot 104, and so forth.

Other output devices 126, such as one or more lights 132, may be elsewhere on an exterior of the robot 104. For example, a light 132 may be arranged on a side of the upper structure.

In some implementations, one or more of the sensors 118, output devices 126, or the mast housing 116 may be movable. For example, the motor 380 may allow for the mast 114, the mast housing 116, or combination thereof to be panned allowing the FOV to move from left to right.

In some implementations, the moveable component 128 may be mounted to the mast 114. For example, the moveable component 128 may be affixed to the mast housing 116. In another example, the moveable component 128 may be mounted to a portion of the mast 114, and so forth.

The robot 104 may include other moveable components 128 as well. For example, the robot 104 may include one or more manipulator arms, a structure that simulates a head, and so forth.

FIG. 6 illustrates a table 600 of trigger conditions 156 and associated gesture data 158, according to some implementations. A table is depicted by way of illustration and not necessarily as a limitation. In other implementations other data structures may be used.

One or more trigger conditions 156 are associated with gesture data 158. The trigger conditions 156 specify when a particular gesture (or set of gestures) should occur, while the gesture data 158 provides the instructions that, when executed, perform the gesture. The gesture data 158 may then be processed by the processor 108, actuator controllers, motor controllers, and so forth to then cause the robot 104 to perform the gesture.

Trigger conditions 156 may comprise conditions that may be compared to data obtained from various sources. The data may include the sensor data 124, input data 144, data generated by the robot 104 or servers 166 during operation, and so forth. For example, data generated by the robot 104 or servers 166 may include path plan data 228.

A trigger condition 156 that a wakeword has been detected may be associated with gesture data 158 for instructions to move the moveable component 128 toward the user 102 who uttered the command. This movement may be facilitated by an initial determination of direction based on the direction of the sound of the utterance as detected by an array of microphones 120, which is further refined by data from a camera 122. The movement provides an acknowledgement to the user 102 that the utterance was heard, while also providing some engagement for the user while the utterance is processed. This is discussed in more detail with regard to FIG. 8.

A trigger condition 156 that is indicative of the robot 104 being directed to start movement to another location may be associated with gesture data 158 to tilt the moveable component upward. For example, as the autonomous navigation module 142 generates instructions to move the robot 104, prior to the movement the gesture may be performed, providing a notification to the user 102 that the robot 104 is about to move.

A trigger condition 156 that is indicative of the robot 104 being directed to stop movement may be associated with gesture data 158 to tilt the moveable component downward. For example, instructions from the autonomous navigation module 142 to slow down or stop the robot 104 may result in, prior to or contemporaneous with a reduction in speed, performance of the gesture to notify the user 102 that the robot 104 is about to stop.

A trigger condition 156 that is indicative of an interaction with the user 102 being concluded may be associated with gesture data 158 to move the moveable component away from the user 102, move the robot 104, and so forth. For example, if the robot 104 has been idle for a threshold amount of time, the robot 104 may move the moveable component 128 such that it is pointed away from the user 102. This may include one or more of a pan, tilt, or rotation. This gesture may simulate looking away from the user 102. In one implementation, if the robot 104 has not been engaged in performing a task for the user 102 for a threshold amount of time, the robot 104 may determine, based on the sensor data 124, a first location of the user 102. A first angle may be determined based on the first location. For example, if the user 102 is located directly in front of the robot 104, the first angle may be 0 degrees. A second angle is determined that differs from the first angle by at least a first value. For example, the second angle may be 37 degrees. In some implementations, the first value may be selected randomly or pseudorandomly from within a specified range of values. The moveable component 128 is then panned to the second angle. In some implementations other motions may be performed. For example, the robot 104 may turn using the wheels 136, the moveable component 128 may be rotated, tilted, and so forth.

In some implementations, the gesture data 158 may further specify that if no further interaction occurs with the user 102, the robot 104 may move to another location, such as a location in the environment designated for waiting, to the docking station 164, and so forth.

A trigger condition 156 that is indicative of a user 102 being within a threshold distance while the robot 104 is stationary may be associated with gesture data 158 to tilt the moveable component 128 up and down to simulate a nod.

A trigger condition 156 that is indicative of a user 102 being within a threshold distance while the robot 104 is moving may be associated with gesture data 158 to tilt the moveable component 128 up and down to simulate a nod while temporarily changing the speed at which the robot 104 is moving. For example, if a first distance between the robot 104 and the user 102 is less than a threshold value, the nodding gesture may be performed, and the overall speed of the robot 104 may be reduced. As the robot 104 passes the user 102, a second distance is determined between the robot 104 and the user 102. If the second distance is greater than the threshold value, the speed may be increased. Continuing the example, the robot 104 may resume the previous speed.

A trigger condition 156 that is indicative of an instruction for the robot 104 to watch the user 102 may result in moving the moveable component 128 to keep the moveable component 128 facing the user 102. For example, as the user 102 walks around the room, the moveable component 128 may pan and tilt to maintain the user 102 within a central area of the image obtained by the camera 122 on the moveable component 128.

A trigger condition 156 that is indicative of an attention request may result in the robot 104 moving the moveable component 128, changing a height of the mast 114, playing a sound from the speaker 134, illuminating the light 132, and so forth.

A trigger condition 156 that determines a confidence value of a user input is greater than a threshold value may be associated with gesture data 158 that comprises instructions to move the moveable component 128 to tilt up and down. For example, the user 102 may utter a command that is processed by one or more of the robot 104, servers 166, or other devices 168. The resulting input data 144 may have a confidence value that is indicative of how likely the input data 144 is to represent the actual intent of the user 102. If the confidence value is greater than the threshold value, the robot 104 may perform a nodding gesture with the moveable component 128, providing the user 102 with an indication that the utterance was properly understood.

In some implementations, the gesture data 158 associated with different trigger conditions 156 may use the same type of motions but performed at different speeds or with different ranges of motion. For example, the angle of the tilt used for the nod to indicate the acknowledgement of the presence of a user 102 may be less than the angle of the tilt used for the nod to indicate the confidence value of the user input is greater than the threshold value. In another example, the speed at which the moveable component 128 is moved, the dwell time of the moveable component 128 in a particular position, and so forth may be varied based on the associated trigger condition 156.

A trigger condition 156 that determines a confidence value of a user input is less than a threshold value may result in gesture data 158 that moves the moveable component 128 to pan side to side, simulating a head shaking gesture. This provides the user 102 with an indication that the utterance was not understood. In another example, the gesture may comprise rotating the moveable component 128, simulating cocking a head to indicate confusion to the user 102.

A trigger condition 156 that determines an undefined task error may result in the robot 104 slowly backing up while keeping the moveable component 128 facing towards the user 102. For example, the undefined task error may occur when the user 102 provides a command that is unable to be complied with, contains an inherent contradiction, or is not recognized. This gesture may be used to indicate confusion to the user 102.

A trigger condition 156 that determines the user 102 is facing the robot 104 and speaking may be associated with gesture data 158 that comprises instructions to move one or more components slowly, such as the moveable component 128, a manipulator arm, and so forth. For example, while the user 102 is facing the robot 104 and speaking, one or more joints in the manipulator arm may be instructed to perform small range low amplitude movements, simulating the slow unconscious movements of a human listener. These movements may animate the manipulator arm.

A trigger condition 156 that determines a valid command has been given by the user 102 may be associated with gesture data 158 that comprises instructions to raise the mast 114 from a first height to a second height and then back down to the first height. This "ducking" by the mast 114 provides a visual indicator that the command has been understood.

Instead of, or in addition to the users 102, the system may provide non-verbal cuing to pets, other robots, and so forth. For example, a trigger condition 156 that determines a pet is present within a threshold distance of the robot 104 may be associated with gesture data 158 that comprises instructions to move the moveable component 128 toward the pet. In another example, the trigger conditions 156 may operate responsive to a person or a pet.

Various combinations of trigger conditions 156 and associated gesture data 158 may be used. In some implementations the gesture data 158 may be disregarded under some conditions. For example, if the gesture data 158 indicates the robot 104 is to back away, but there is an obstruction behind the robot 104, that portion of the gesture may not be performed.

Figure 7:
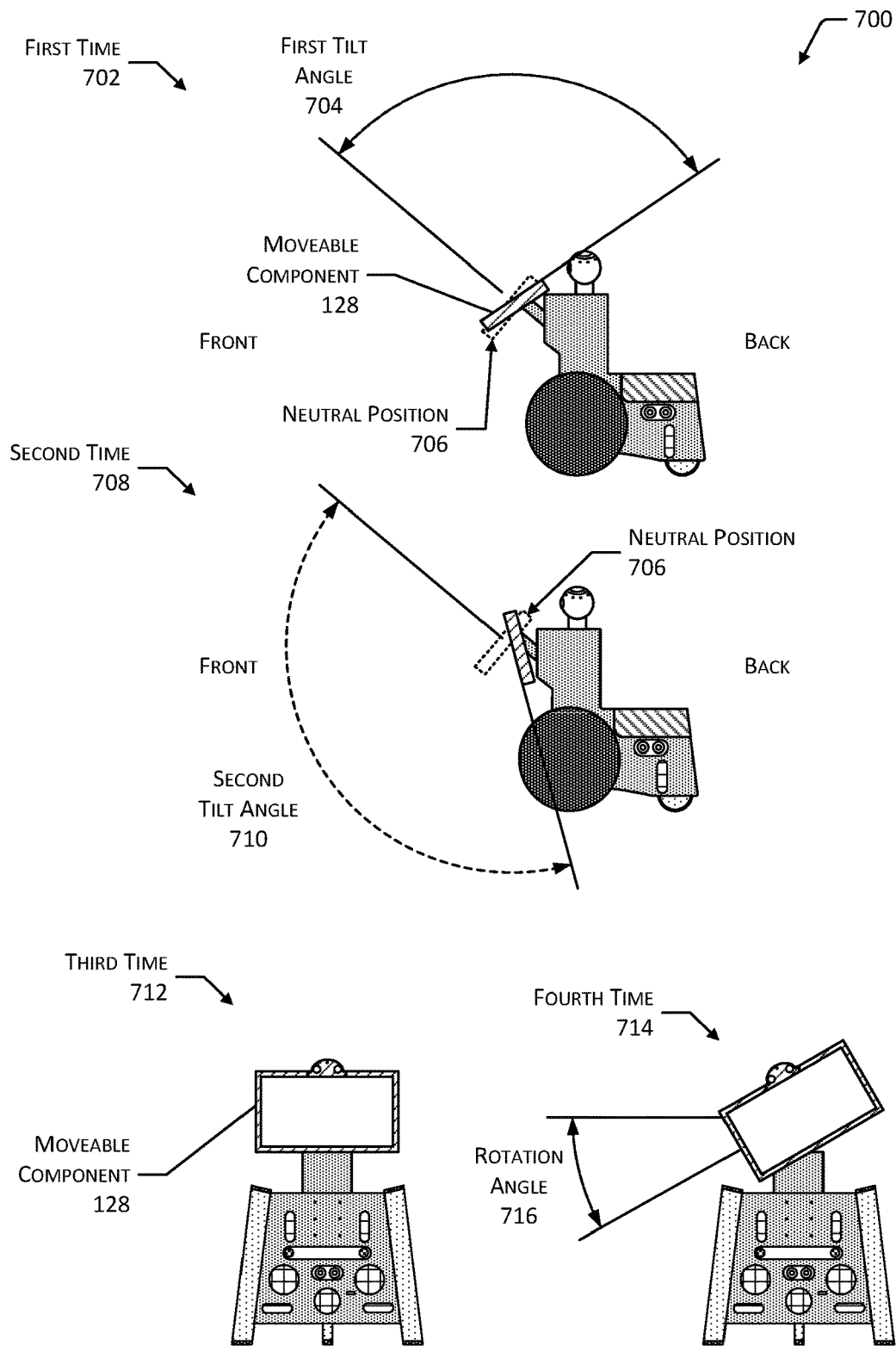
FIG. 7 illustrates some motions of the moveable component, according to some implementations.

FIG. 7 illustrates at 700 some motions of the moveable component 128, according to some implementations. At a first time 702 the moveable component 128 is shown having been tilted up to produce a first tilt angle 704 relative to a neutral position 706. At a second time 708 the moveable component 128 is shown having been tilted down to produce a second tilt angle 710 relative to the neutral position 706.

The robot 104 and the moveable component 128 are shown at a third time 712 as viewed from the front, with the moveable component 128 in a horizontal orientation. At a fourth time 714 the moveable component 128 is shown having been rotated to produce a rotation angle 716 with respect to horizontal.

Figure 8:
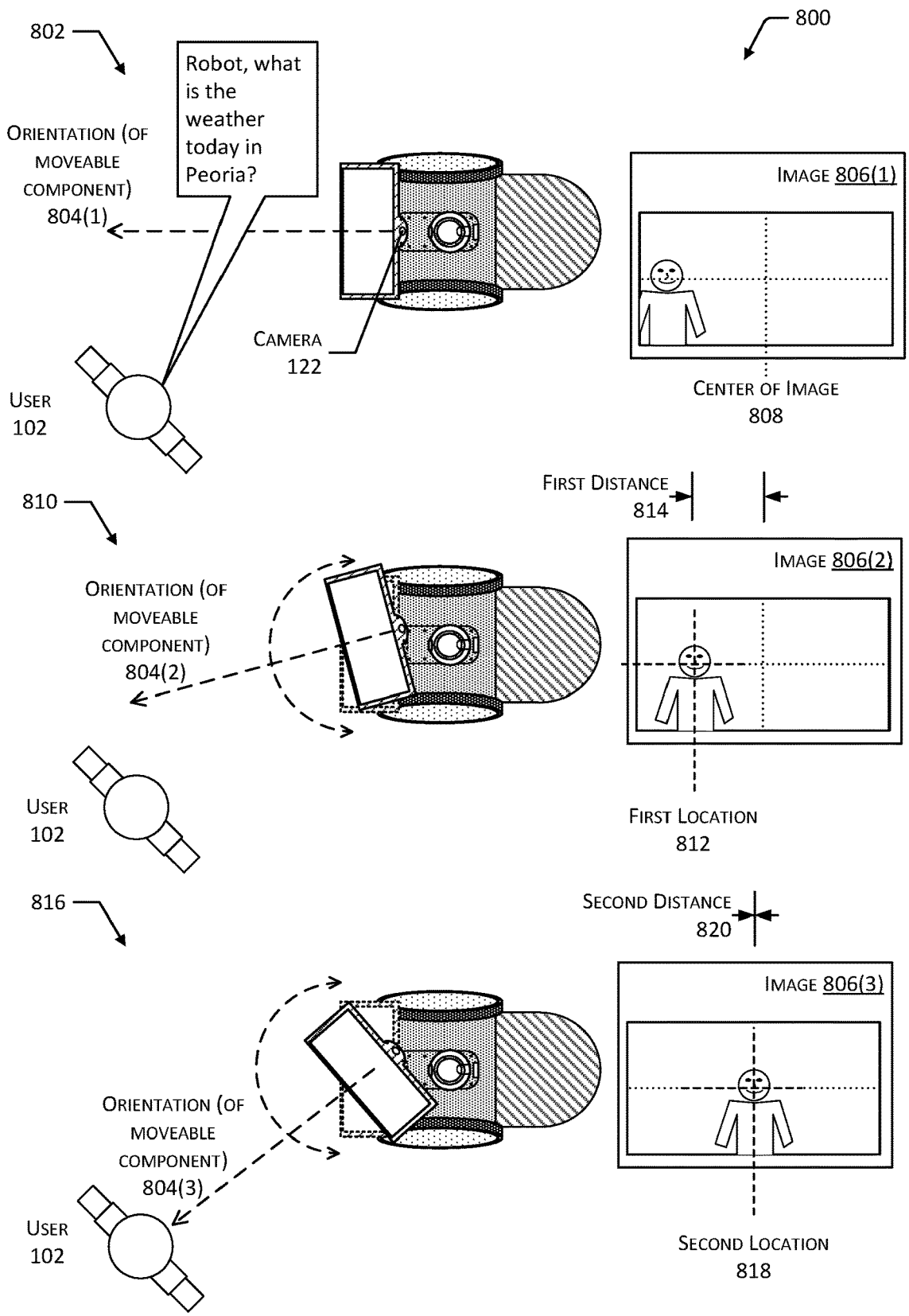
FIG. 8 illustrates the moveable component panning towards a sound of an utterance and using images from a camera to point the moveable component at the source of the utterance, according to some implementations.

FIG. 8 illustrates at 800 the moveable component 128 panning towards a sound of an utterance and using images from a camera 122 to point the moveable component 128 at the source of the utterance, according to some implementations.

At 802 the user 102 is positioned to the left of the robot 104, and utters "robot, what is the weather today in Peoria?". The robot 104 includes a moveable component 128 which has an orientation 804(1) that is directed straight ahead, relative to the chassis of the robot 104. A camera on the moveable component 128 may acquire an image 806(1). The image 806(1) has a center of image 808. For example, the center of image 808 may comprise a geometric center of the two-dimensional image. In this illustration, the user 102 is depicted on the far left of the image 806(1). In other implementations the camera 122 may be located elsewhere on the robot 104. For example, the mast housing 116 may include a camera 122.

The wakeword detection module 234 detects the predetermined wakeword of "robot" and begins processing the audio data from the array of microphones 120. The audio data is assessed to determine a first direction of the utterance. For example, given a known arrangement of microphones 120 in the array, and given differences in one or more of amplitude, phase angle, or other characteristics of the audio data for each of the microphones 120, a direction of the sound may be determined. In some implementations, beamforming techniques may be used to process the audio and determine an angular direction, with respect to the array, of maximum amplitude of the utterance.

The gesture module 154 determines that a trigger condition 156, utterance of the wakeword, has been satisfied. Associated with the trigger condition 156 is the gesture data 158 comprising instructions that, when executed by one or more controllers, operate one or more of the moveable component actuators 388 to move the moveable component 128 toward the first direction. To the user 102, it would appear that the moveable component 128 is turning to face them.

In some implementations the entire robot 104 may move as well. For example, if the first direction is located outside a maximum angle of movement of the moveable component 128, the robot 104 may use the wheels 136 to rotate instead of or in addition to moving the moveable component 128.

At 810 the moveable component 128 has been panned to the left of the robot's 104 centerline, towards the first direction in which the user 102 was determined to be present based on the sound of the utterance. A second image 806(2) may be acquired by the camera 122 on the moveable component 128. A facial detection module may be used to determine a face that is present in the second image 806(2). A first location 812 is indicative of a region within the image 806(2) that appears to depict a human face. For example, the first location 812 may comprise a geometric center of the region. In another example, the first location 812 may be indicative of a location in the image 806 of a left eye, right eye, geometric center of a triangle with vertices at the eyes and mouth, and so forth.

A first distance 814 may be determined that indicates a distance between the first location 812 and the center of image 808. In some implementations, the distance may be a straight-line distance, a horizontal distance, or a vertical distance. For example, the first distance 814 may be a horizontal distance in pixels between the first location 812 and the center of image 808.

A second direction is determined based on the first location 812. For example, the value of the first distance 814 may be used to retrieve from a lookup table or other data structure a value indicative of a direction. Continuing the example, a first distance 814 of +269 pixels (to the left of the center of image 808) may correspond to a second direction that is located −37 degrees to the left of the current orientation 804(2) of the moveable component 128.

At 816 the moveable component 128 has been panned and the image of the user 102 is within a central area of the image 806(3). The facial detection module may determine a second location 818 of the face depicted in the image 806(3). In this illustration, the second location 818 is within a second distance 820 of the center of image 808. The orientation 804(3) of the moveable component 128 is now directed towards the user 102, resulting in the moveable component 128 being pointed at or towards the user 102. With this orientation 804(3), the moveable component 128 is pointed at the user 102 and the user 102 is able to see the display 130 while the sensors 118 on the moveable component 128 are pointed at the user 102.

If the second distance 820 is greater than a threshold value that is representative of a maximum permissible tracking error, the process may continue and the moveable component 128 may continue to move while trying to center the face of the user 102 in the subsequently acquired images 806. In this way, the moveable component 128 may track or follow the user 102 as they move within the environment.

The moveable component 128 may move toward the first direction as indicated above. If the user 102 is not detected within one or more of the images 806, the movable component 128 may continue to pan. If the maximum angle of panning has been reached, the entire robot 104 may be rotated. For example, the wheels 136 may be used to turn the robot 104, allowing for the camera 122 to continue to survey the surrounding environment to find the user 102.

In other implementations, other features may be detected and used instead of or in addition to the face. For example, the eyes, head, body, and so forth of the user 102 may be detected and used.

In some implementations, the user identification data 152 may be used to determine which user 102 to turn towards. For example, if the utterance is processed and user identification data 152 is generated that indicates the user 102 who spoke the utterance is likely to be "Pat", the robot 104 may pan the moveable component 128 until it is pointed towards the user 102 designated as "Pat". Continuing the example, the user 102 may be identified in the image 806 using facial recognition techniques. Once the image of the user 102 identified as "Pat" has been detected, the moveable component 128, robot 104, or both may move to place the image of "Pat" within the center of the image(s) 806 acquired by the camera 122 on the moveable device 128.

In other implementations, the first distance 814, second distance 820, and so forth may be determined with respect to a point other than the center of the image 808. For example, the first distance 814 may be determined with respect to a left edge of the image 806.

In another implementation, the facial detection module may be used to determine if a user 102 is speaking. The gesture module 154 may be configured to move the moveable component 128 so that the orientation 804 is pointed at the user 102 who is speaking.

Several gestures may be combined for execution in series, one after another, or in parallel in which several gestures are performed at once. For example, after the moveable component 128 has turned toward the user 102, if confidence in the determination as to what the intent of the utterance of the user 102 is less than a threshold value, the moveable component 128 may be rotated. This rotation may simulate a cocking of the head to indicate the robot 104 did not understand the utterance.

Figure 9:
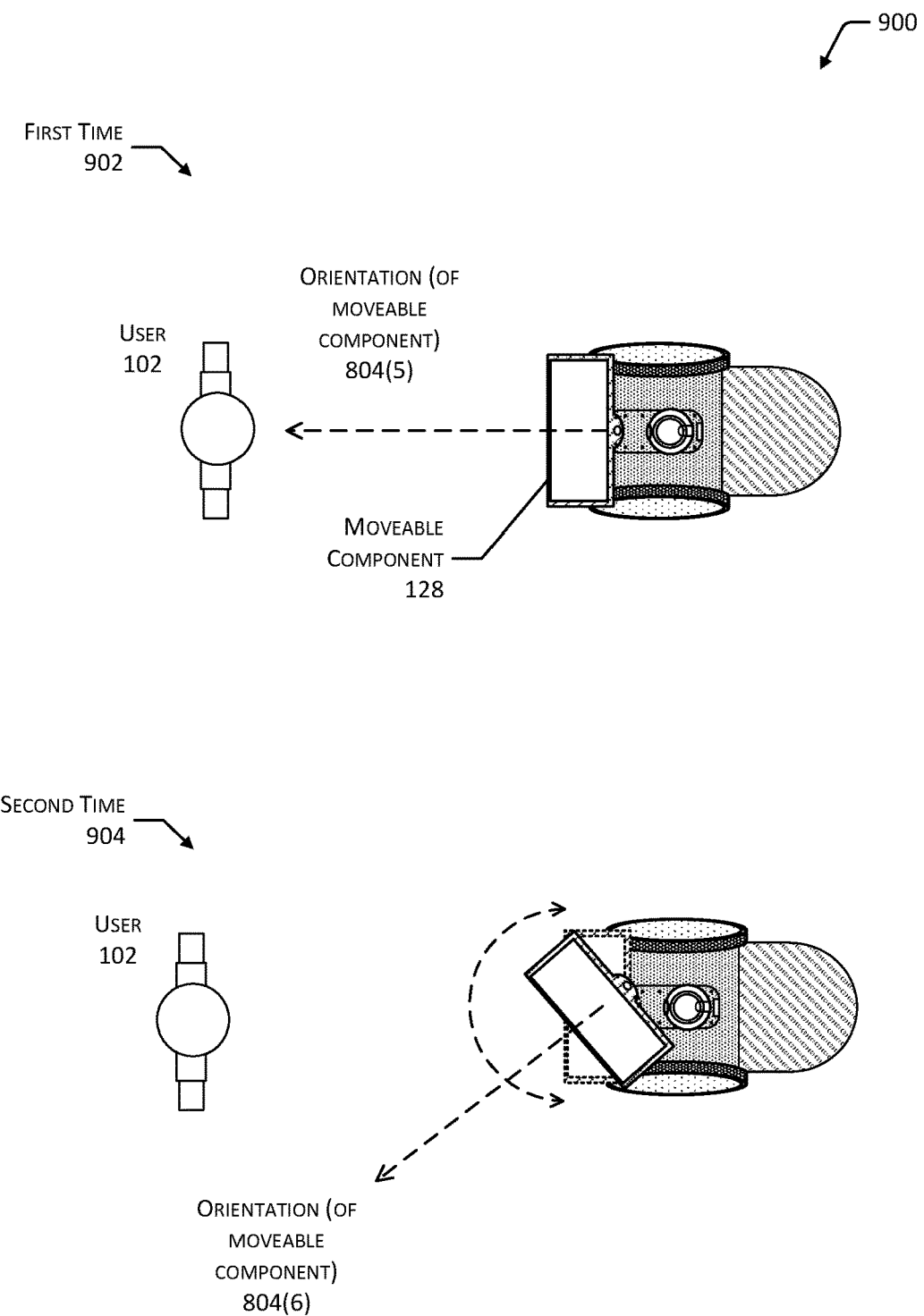
FIG. 9 illustrates the moveable component moving after an interaction with a user concludes, according to some implementations.

FIG. 9 illustrates the moveable component 128 moving after an interaction with a user 102 concludes, according to some implementations. At a first time 902, the user 102 has concluded interacting with the robot 104. At the first time 902, the moveable component 128 remains pointed at the user 102, with the orientation 804(5) of the moveable component 128 directed towards the location of the user 102 in the environment.

The robot 104 is shown at a second time 904 after having been idle for a threshold amount of time. The robot 104 has moved the moveable component 128 to be pointed away from the user 102, such that the orientation 804(6) of the moveable component 128 is directed away from the location of the user 102. In some implementations, the difference between the orientation 804(5) and the orientation 804(6) may have a minimum angle. For example, the robot 104 may randomly select an angle that is at least 15 degrees away from a center of the location of the user 102.

In some implementations other motions may be performed. For example, the robot 104 may turn using the wheels 136, the moveable component 128 may be rotated, tilted, and so forth.

Figure 10:
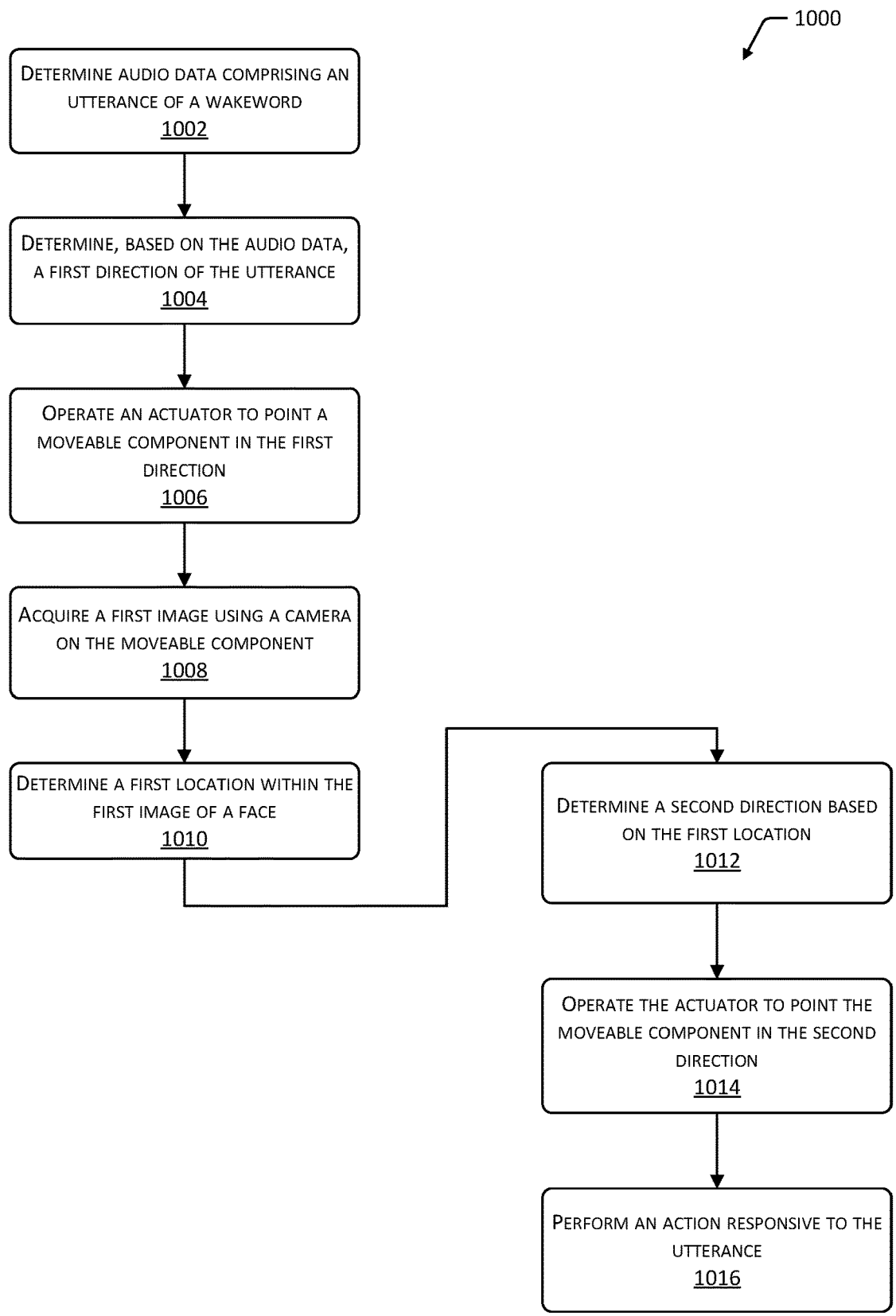
FIG. 10 is a flow diagram of a process to provide a non-verbal cue to a user that their utterance has been heard, according to some implementations.

FIG. 10 is a flow diagram 1000 of a process to provide a non-verbal cue to a user 102 that their utterance has been heard, according to some implementations. The process may be implemented at least in part by one or more of the processors 108 on the robot 104, the servers 166, the docking station 164, or other devices 168.

At 1002 audio data comprising utterance of a wakeword is determined. In one implementation, an array of microphones 120 may generate audio data 236 representative of an utterance by the user 102. The audio data 236 may be processed by the speech processing module 222, with the wakeword detection module 234 determining that the wakeword is present in the audio data 236. For example, the user 102 may have uttered "robot, place a video call to Pat."

In some implementations, at least a portion of the audio data 236, or data based on the audio data 236, may be sent to the one or more servers 166 for further processing. For example, the audio data 236 may be sent via the WLAN interface 302 to the servers 166.

At 1004, based on the audio data 236, a first direction of the utterance is determined. For example, the audio data 236 may comprise audio acquired by the different microphones 120 in the array. The direction may be determined by comparing one or more of amplitude or phase.

At 1006 one or more actuators are operated to move one or more of a moveable component 128, mast 114, wheels 136, and so forth to point in the first direction. For example, the moveable component 128 may be panned to point in the first direction.

At 1008 a first image 806 is acquired using a camera 122. For example, the camera 122 may be located on the moveable component 128.

At 1010 a first location 812 of a face within the first image 806 is determined. In some implementations a Haar cascade classifier or a local binary patterns (LBP) classifier may be used to determine if a face is present in the image 806. In other implementations other techniques may be used.

At 1012 a second direction is determined based on the first location 812. In one implementation, a particular column or range of columns in the image 806 may be associated with a particular direction with respect to the camera 122. For example, if the first location 812 is centered on column 107 of the image 806, this may correspond to a direction that is 53 degrees to the left of center of the current orientation of the camera 122. In other implementations other techniques may be used to determine the orientation.

At 1014 one or more actuators are operated to move one or more of a moveable component 128, mast 114, wheels 136, and so forth to point in the second direction. For example, the moveable component 128 may be panned to point in the second direction.

At 1016 an action responsive to the utterance is performed. For example, the one or more servers 166 may return the input data 144 that is indicative of the intent of the utterance to the robot 104. Continuing the example, the utterance may have input data 144 to "place video call to Pat Smith". A task module 146 may process the input data 144 and retrieve the network address to place a video call to Path Smith, using the camera 122 to acquire images 806 to send to Pat Smith's device and using the display device 130 to present the images received from Pat Smith's device.

After completing the task, the robot 104 may wait for a period of time. This period of time may be randomly or pseudorandomly selected from within a range of time. For example, the robot 104 may wait for a time interval that is between one and four minutes. If the robot 104 remains idle for longer than this period of time, the robot 104 may satisfy a trigger condition 156 of "interaction with user concluded". For example, if the robot 104 is not performing a task that involves the user 102, it may wait until the period of time expires. The robot 104 may then perform the gesture data 158, which may direct the moveable component 128 to be oriented 804 away from the user 102. After a second period of time, if there is still no interaction with the user 102, the robot 104 may move to another location. For example, the robot 104 may move to a waiting area, proceed to the docking station 164, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
    a chassis;
    one or more sensors;
    a moveable component attached to the chassis, the moveable component comprising:
        a display device, and
        a camera;
    one or more actuators to move the moveable component;
    one or more motors coupled to one or more wheels; and
    one or more processors to execute instructions to:
        acquire sensor data from the one or more sensors;
        determine, based at least on the sensor data, a trigger condition has been satisfied;
        operate the one or more actuators to move the moveable component at a first time;
        determine a task has been completed at a second time;
        determine an interval of time has elapsed since the second time;
        acquire a first image from the camera;
        determine a first face that is depicted in the first image;
        determine a first geometric center of the first face in the first image;
        determine a first location in the first image that is greater than a threshold distance from the first geometric center;
        determine a first direction based on the first location; and
        operate the one or more actuators to move the moveable component at a third time such that a line extending from a center point of the display device is pointed in the first direction.

2. The robot of claim 1, wherein the one or more sensors comprise a microphone array comprising a plurality of microphones; and the one or more processors to further execute the instructions to:
    determine audio data using the microphone array;
    determine, based on the audio data, a second direction associated with a source of the audio data; and
    operate the one or more actuators to move the moveable component such that the line extending from the center point of the display device that is perpendicular to a surface of the display device is directed in the second direction.

3. The robot of claim 1, the one or more processors to further execute the instructions to:
    determine a user associated with the task; and
    operate the one or more actuators to move the moveable component towards the user.

4. An autonomous mobile device comprising:
    a chassis having a front and a back;
    one or more sensors;
    a communication interface;
    a motor coupled to one or more wheels;
    a moveable component attached to a support structure that extends away from the front of the chassis, wherein the moveable component comprises a display screen and a camera;
    an actuator coupled to the moveable component; and
    one or more processors to execute instructions to:
        acquire sensor data from the one or more sensors;
        determine a trigger condition has been satisfied;
        operate the actuator to move the moveable component at a first time;
        determine a task has been completed at a second time;
        acquire a first image using the camera;
        determine a first face that is depicted in the first image;
        determine a first geometric center of the first face in the first image;
        determine a first location in the first image that is at least a threshold distance from the first geometric center;
        determine a first direction based on the first location; and
        operate the actuator to move the moveable component at a third time such that a line extending from a center point of the display screen is pointed in the first direction.

5. The autonomous mobile device of claim 4, wherein the movement of the moveable component at the first time comprises one or more of:
    tilting the moveable component up and down with respect to a first axis;
    rotating the moveable component with respect to a second axis that is orthogonal to the first axis; or
    panning the moveable component, with respect to a third axis that is orthogonal to the first axis and the second axis:
        to a first angle at a fourth time,
        to a second angle at a fifth time, and
        to a third angle at a sixth time that is between the first angle and the second angle.

6. The autonomous mobile device of claim 4, wherein the one or more sensors comprise a microphone array comprising a plurality of microphones affixed to the moveable component; and
    the one or more processors to further execute the instructions to:
        acquire audio data using the microphone array;
        determine the trigger condition has been satisfied by presence of a wakeword in the audio data;
        determine, based on the audio data, a second direction of a source of the audio data;
        operate the actuator to move the moveable component toward the second direction;
        acquire a second image using the camera;
        determine a second location in the second image that is associated with a second face depicted in the second image;
        determine a third direction based on the second location; and operate the actuator to move the moveable component to point in the third direction.

7. The autonomous mobile device of claim 6, the one or more processors to further execute the instructions to:
    determine, based on the audio data, a first user identifier;
    determine the second face is associated with a second user identifier;
    determine a third face in the second image;
    determine the third face is associated with the first user identifier;
    determine a third location in the second image of the third face;
    determine a fourth direction based on the third location; and
    operate the actuator to move the moveable component to point in the fourth direction.

8. The autonomous mobile device of claim 4, the one or more processors to further execute the instructions to:
    determine, based on the sensor data, that a person is within a threshold distance of the autonomous mobile device at a fourth time;
    move the moveable component to a first tilt angle; and
    move the moveable component to a second tilt angle.

9. The autonomous mobile device of claim 4, the one or more processors to further execute the instructions to:
    move, at a fourth time, the autonomous mobile device at a first speed;
    determine, based on the sensor data, a first distance to a person at a fifth time;
    determine the first distance is less than a second threshold distance; and
    move, at a sixth time, the autonomous mobile device at a second speed that is less than the first speed.

10. The autonomous mobile device of claim 4, the one or more processors to further execute the instructions to:
    determine, based on the sensor data, a location of a person; and
    move the moveable component to point at the location of the person.

11. The autonomous mobile device of claim 4, the one or more processors to further execute the instructions to:
    determine, based at least on the sensor data, a command to perform the task; and
    change a mast height from a first height to a second height.

12. The autonomous mobile device of claim 4, the one or more processors to further execute the instructions to:
    determine, based at least in part on the sensor data, input indicative of a command to perform the task;
    determine a confidence value associated with the input is less than a threshold value; and
    rotate the moveable component along an axis that is perpendicular to a plane of the display screen.

13. The autonomous mobile device of claim 4, the one or more processors to further execute the instructions to:
    determine, based at least in part on the sensor data, input indicative of a command to perform the task;
    determine a confidence value associated with the input is greater than or equal to a threshold value;
    move the moveable component to a first tilt angle; and
    move the moveable component to a second tilt angle.

14. A computer-implemented method comprising:
    determining a trigger condition has been satisfied;
    operating one or more actuators of an autonomous mobile device to move a moveable component of the autonomous mobile device at a first time;
    determining a task has been completed at a second time;
    acquiring a first image using a camera of the autonomous mobile device;
    determining a first face depicted in the first image;
    determining a first geometric center of the first face in the first image;
    determining a first location in the first image that is at least a threshold distance from the first geometric center;
    determining a first direction based on the first location; and
    operating the one or more actuators of the autonomous mobile device at a third time to move the moveable component in the first direction.

15. The computer-implemented method of claim 14, further comprising:
    acquiring audio data from a microphone array of the autonomous mobile device;
    determining, based on the audio data, a second direction associated with a source of the audio data; and
    operating the one or more actuators to move the moveable component to point in the second direction.

16. The computer-implemented method of claim 14, further comprising:
    determining a first distance between the autonomous mobile device and a person at a fourth time;
    determining the first distance is less than a threshold distance; and
    operating the one or more actuators to tilt the moveable component to a first tilt angle at a fifth time and a second tilt angle at sixth time.

17. The computer-implemented method of claim 14, further comprising:
    moving the autonomous mobile device at a first speed at a fourth time;
    determining a first distance between the autonomous mobile device and a person at a fifth time;
    determining the first distance is less than a threshold distance;
    moving, at a sixth time, the autonomous mobile device at a second speed that is less than the first speed;
    operating the one or more actuators to tilt the moveable component to a first tilt angle at a seventh time and a second tilt angle at an eighth time;
    determining a second distance between the autonomous mobile device and the person is greater than the threshold distance; and
    moving, at a ninth time, the autonomous mobile device at a third speed that is greater than the second speed.

18. The computer-implemented method of claim 14, further comprising:
    acquiring a second image;
    determining a second location in the second image that is associated with at least a portion of a second face depicted in the second image;
    determining a second direction based on the second location; and
    operating the one or more actuators of the autonomous mobile device to point the moveable component in the second direction.

19. The computer-implemented method of claim 14, further comprising:
    determining input indicative of a command to perform the task;
    determining a confidence value associated with the input is less than a threshold value; and
    moving the autonomous mobile device backward along a curved path while keeping the moveable component pointed at a person.

20. The computer-implemented method of claim 14, further comprising:
- acquiring audio data from a microphone array of the autonomous mobile device;
- determining the audio data is indicative of a command to perform the task;
- determining a confidence value associated with the command is less than a threshold value; and
- rotating the moveable component along an axis that is perpendicular to a plane of a display screen in the moveable component.

* * * * *